United States Patent [19]
Varian

[11] Patent Number: 5,349,611
[45] Date of Patent: Sep. 20, 1994

[54] RECOVERING SYNCHRONIZATION IN A DATA STREAM

[75] Inventor: George R. Varian, Palo Alto, Calif.

[73] Assignee: Ampex Systems Corporation, Redwood City, Calif.

[21] Appl. No.: 3,896

[22] Filed: Jan. 13, 1993

Related U.S. Application Data

[63] Continuation of Ser. No. 974,745, Nov. 13, 1992, abandoned.

[51] Int. Cl.$^5$ .......................... H04L 7/00; H04L 9/00; H04J 3/06
[52] U.S. Cl. ........................ 375/115; 375/116; 380/46; 380/48; 370/107
[58] Field of Search ............... 375/1, 96, 112, 114, 375/115, 116; 380/46, 48, 49, 50; 371/40.1, 40.2, 42; 370/106, 107

[56] References Cited

U.S. PATENT DOCUMENTS

| | | |
|---|---|---|
| 3,065,302 | 11/1962 | Kaneko . |
| 3,065,303 | 11/1962 | Kaneko . |
| 3,069,504 | 12/1962 | Kaneko . |
| 3,087,996 | 4/1963 | Kaneko . |
| 3,510,595 | 5/1970 | Gutleber . |
| 3,532,985 | 10/1970 | Glomb et al. . |
| 3,566,268 | 2/1971 | Webb . |
| 3,648,237 | 3/1972 | Frey, Jr. et al. . |
| 3,694,757 | 9/1972 | Hanna, Jr. . |
| 3,699,344 | 10/1972 | Rutz . |
| 3,731,198 | 5/1973 | Blasbalg . |
| 3,789,377 | 1/1974 | Norris . |
| 3,854,011 | 12/1974 | Mallory et al. . |
| 3,914,740 | 10/1975 | Han . |
| 4,168,529 | 9/1979 | Tomlinson . |
| 4,357,702 | 11/1982 | Chase et al. . |
| 4,383,322 | 5/1983 | Halpern et al. ............ 380/46 |
| 4,426,712 | 1/1984 | Gorski-Popiel . |
| 4,442,527 | 4/1984 | Munday . |
| 4,590,601 | 5/1986 | Beeman ..................... 375/115 |
| 4,646,329 | 2/1987 | Bojarski ..................... 375/116 |
| 4,788,681 | 11/1988 | Thomas et al. . |
| 4,791,653 | 12/1988 | McFarland et al. . |
| 4,817,148 | 3/1989 | Lafferty et al. .............. 375/115 |
| 4,847,877 | 7/1989 | Besseyre .................... 375/116 |
| 4,993,029 | 2/1991 | Galbraith et al. . |
| 5,204,883 | 4/1993 | Blanc ........................ 375/116 |
| 5,235,645 | 8/1993 | Stocker ..................... 380/46 |

Primary Examiner—Stephen Chin
Assistant Examiner—Duane Kobayashi
Attorney, Agent, or Firm—John G. Mesaros; George B. Almeida

[57] ABSTRACT

Input data symbols are written in a write buffer then to a sync adder, which appends a pseudo randomly (PN) generated sync bit to the MSB position of a four-symbol sync word data field, to generate a sync word. Sync words may or may not be randomized and sent to a receiver whereafter synchronization is recovered and perhaps de-randomized symbols are written into particular positions of an ECC block in a read buffer which are derivable from the PN sequence. The ECC block is a data array having multi-bit sync words making up its rows and the bit positions of the sync words making up its columns. Synchronization recovery apparatus conceptually looks at each bit position across a row and in a top-to-bottom direction down each of the columns to locate that column which contains the appended PN sequence. Sync recovery involves the receiver re-generating the same PN sequence that was generated at the transmitter. When the sync bit position is found, the data stream is assembled into fixed length sync words and written into the read buffer. Further, the position of the sync bit in the PN sequence is used to generate an address for writing the ECC codeword in a read buffer. Synchronization recovery circuit passes along to the read buffer both ECC codeword data symbols and sync bit position in the form of a read buffer address. Error rate measurement can be done by comparing a received PN sequence with a reconstructed PN sequence.

46 Claims, 9 Drawing Sheets

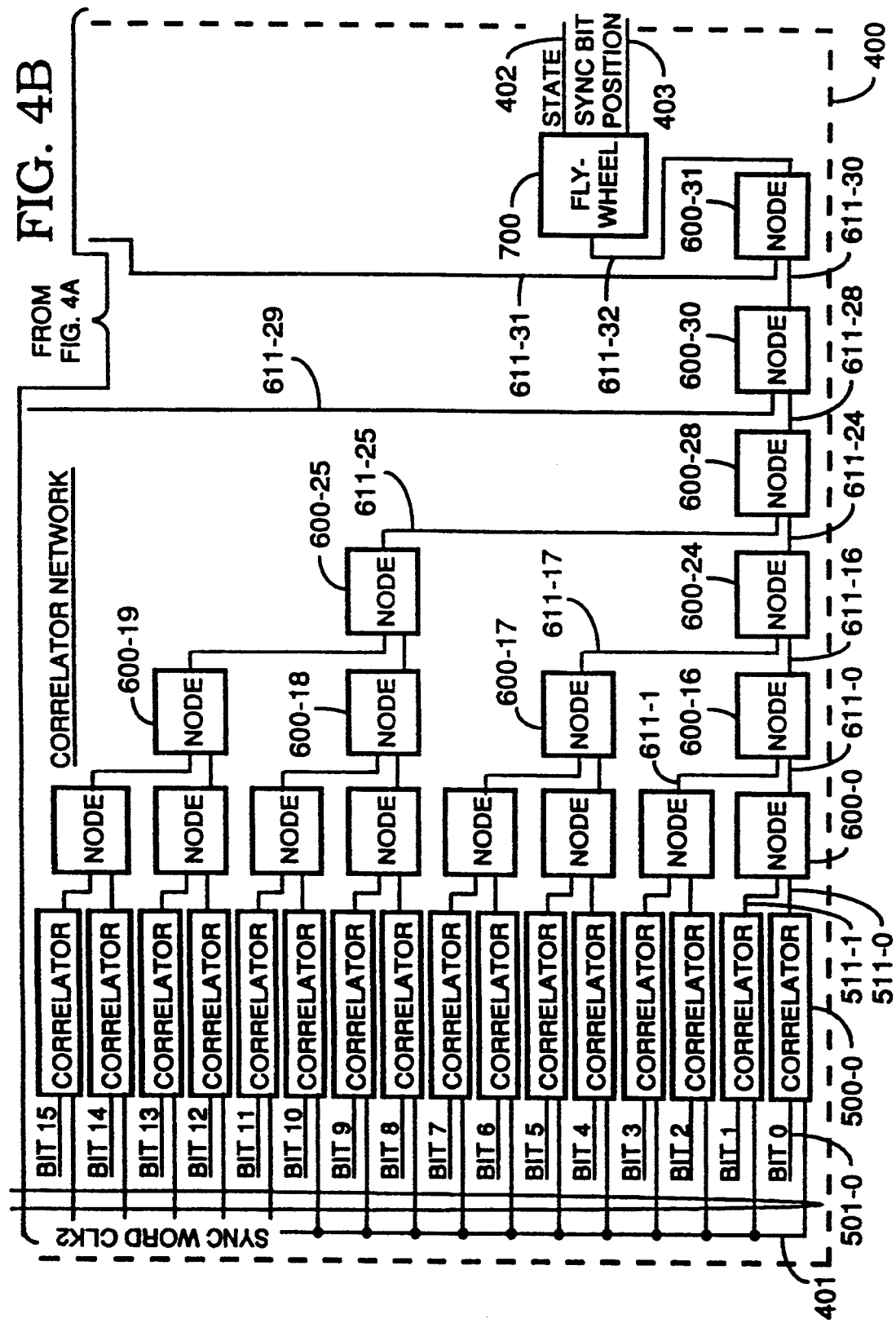

RECOVERING SYNCHRONIZATION IN A DATA STREAM

CROSS REFERENCE TO RELATED APPLICATION

This application is a continuation of copending patent application Ser. No. 07/974,745 filed Nov. 13, 1992, now abandoned.

BACKGROUND OF THE INVENTION

1. Field of the Invention

This invention relates to the synchronization of digital data information signals and, more particularly, to synchronizing, and recovering the synchronization of, digital data information signals by positioning the digital data that comprises a data stream into particular positions of the data structure.

2. Description of Related Art

Several synchronization schemes for obtaining and recovering synchronization of a data structure are known in the art. Typically, a data structure comprises a plurality of bits which, for purposes of illustration, can be viewed as a serial bit stream. The serial bit stream can be structured various ways. One way is to structure the serial bit stream into a plurality of fixed length data symbols, typically a plurality of bytes where each byte is eight-bits in length. In turn, one or more data symbols can comprise an error correcting code (ECC) codeword while a fixed length ECC block comprises an interleaved set of one or more ECC codewords such as Reed Solomon codewords.

In a known arrangement, apparatus can check the serial bit stream, for example, on a bit-by-bit basis until the apparatus detects a special multibit synchronization (sync) word whereupon synchronization can be said to have been recovered. The special multibit sync word can be regularly, or even periodically, inserted in the bit stream by transmitter apparatus and then can be forwarded over a transmission communications channel to a receiver. The receiver can include synchronization apparatus to recover synchronization of the information comprising the bit stream. However, when a special multibit sync word is used, then that special sync word typically becomes a "non-allowed bit pattern" in the sense that if that particular bit pattern defines the special multibit sync word it cannot also define transmitter-to-receiver information. It ought to be mentioned, however, that there are some recognized exceptions to the "cannot also define" comment.

Even though the foregoing form of synchronization arrangement is useful for synchronizing symbols that comprise the bit stream, it does not solve the problem of synchronizing the ECC blocks which themselves comprise a plurality of ECC codewords. For example, while the described arrangement is useful for identifying the boundaries of a codeword and for thus synchronizing the codeword within a bit stream, the further problem of identifying exactly where the codeword fits within the boundaries of the ECC block remains. That problem has been solved in other ways. In one solution, the special multibit sync word is followed by an address word which identifies the position within the ECC block where the next data up to the next sync word following the special sync word is to be positioned. In that manner, an address word can regularly, or even periodically, be coupled with a special multibit sync word not only to obtain word synchronization but also to obtain ECC block synchronization.

Unfortunately, known synchronization arrangements suffer in that synchronization is not recoverable until the next special multibit sync word is detected. In addition, there is an "overhead" represented by the regular inclusion of the special multibit sync word and address word. Unfortunately, overhead represents a loss of throughput to the arrangement. For example, one known special multibit sync word comprises two consecutive special sync bytes followed by two consecutive address bytes being included in each ECC codeword in addition to some ECC check bytes. Assuming that an ECC codeword comprises, for example, about 100 data symbols with each data symbol being an eight-bit byte, it is not unusual to find that the overhead is about four-to-ten percent particularly if the ECC that is used to protect the address word is also included in overhead. Clearly, if the special multibit sync codeword is transmitted too frequently, it further increases the "overhead."

It is also recognized that synchronization schemes need to operate in the presence of errors. For example, synchronization must not fail (a) on non-detection of a loss of sync or (b) on the detection of a spurious sync word such as when a word, which is not actually in the data stream, is erroneously detected by a sync detector as being a sync word. Known synchronization systems do not economically and robustly operate in such situations.

SUMMARY OF THE INVENTION

These and other problems are solved in accordance with the principles of my invention as used in an illustrative embodiment of those principles in which, for purposes of illustration only and not by way of limitation, input data symbols are written into a write buffer and are then provided to a sync adder, which appends a pseudo randomly (PN) generated sync bit to the most significant bit (MSB) position of a multi-symbol synchronization (sync) word data field, to generate a sync word. Sync words may be randomized and sent over a communications channel to a receiver or may be recorded on a storage device for later retrieval and/or playback whereafter synchronization of the received data stream is recovered and de-randomized symbols are written into particular positions of an ECC block in a read buffer.

Sync recovery involves the receiver re-generating the same PN sequence that was generated at the transmitter. When the sync bit position for the sync words in the received data stream is found, the data stream is assembled into fixed length sync words that are written into the read buffer. What is more, the position of the sync bit in the PN sequence is used to generate an address for writing an ECC codeword in the read buffer. A synchronization recovery circuit passes along to the read buffer both ECC codeword data symbols and the address of each symbol in the read buffer, which is decoded from the state of the PN sequence.

My synchronization recovery system associates a state of a pseudo-random (PN) sequence provided by a first, or a transmitter, PN generator with a data location in a write buffer and a data location in a read buffer. A bit from the PN sequence from the transmitter PN generator is appended to a data word as a sync bit to generate a sync data word that is stored or transmitted. In recovering synchronization, the position of the sync bit is located or discovered within a received sync data word by reconstructing at the receiver the same PN sequence that was generated at the transmitter. Once located, the PN state associated with that sync bit position in the received sync word is used (a) to locate the position of that PN state within a PN sequence generated at the receiver and (b) in response thereto, to provide a data location in the read buffer so that the data word location in the read buffer is in correspondence with the data word location in the write buffer.

In doing the above, sync adder apparatus can randomize each sync word by applying a reversible operation to each word in a sequence of sync data words in a data stream and by applying a mathematical function to each subsequent state in a PN sequence from a PN generator. The sync adder apparatus appends the bit corresponding to the state of the PN generator to the word as its sync bit prior to transmitting the word in the data stream. The location of the PN sequence in the data stream of received data as well as the state corresponding to the PN sequence is determined. The word boundaries of two or more sync words are aligned using the PN sequence. The reverse of the reversible operation can then be applied to re-randomize each received sync word and the same mathematical function of the PN state associated with PN sequence bit which was appended to the word can be applied thus restoring the original data.

The mathematical function used is the exclusive OR of (a) the PN state and (b) the majority of a predetermined number of the bits of the PN state appended to the compliment of the exclusive OR of the PN state and (c) the majority of the predetermined number of the bits of the PN state.

Also, the coefficients of a polynomial used by the PN generator are $x^{16}+x^{12}+x^3+x+1$.

Finally, error rates in the data stream are measurable with a correlator network for determining the bit in the sync bit position in the data stream and for determining a PN state corresponding to a bit position in a reconstructed PN sequence of sync bits. That can provide a first sync bit. A data shifter synchronously aligns two or more data words in the data stream. That can provide a second sync bit. Those first and the second sync bits are compared and the comparison results in a signal indicating a relation between the difference between the first and the second sync bits where the difference is a measure of the error rate in the data stream. Stated alternatively, the error rate can be measured by comparing the difference between the received PN sequence, as read from the received data stream, and the reconstructed PN sequence, as generated by the PN generator at the receiver.

BRIEF DESCRIPTION OF THE DRAWING

These and other advantages of the present invention will become apparent from the following detailed description when taken in conjunction with the accompanying drawing in which.

DETAILED DESCRIPTION

Synchronization System 100

Figure 1:
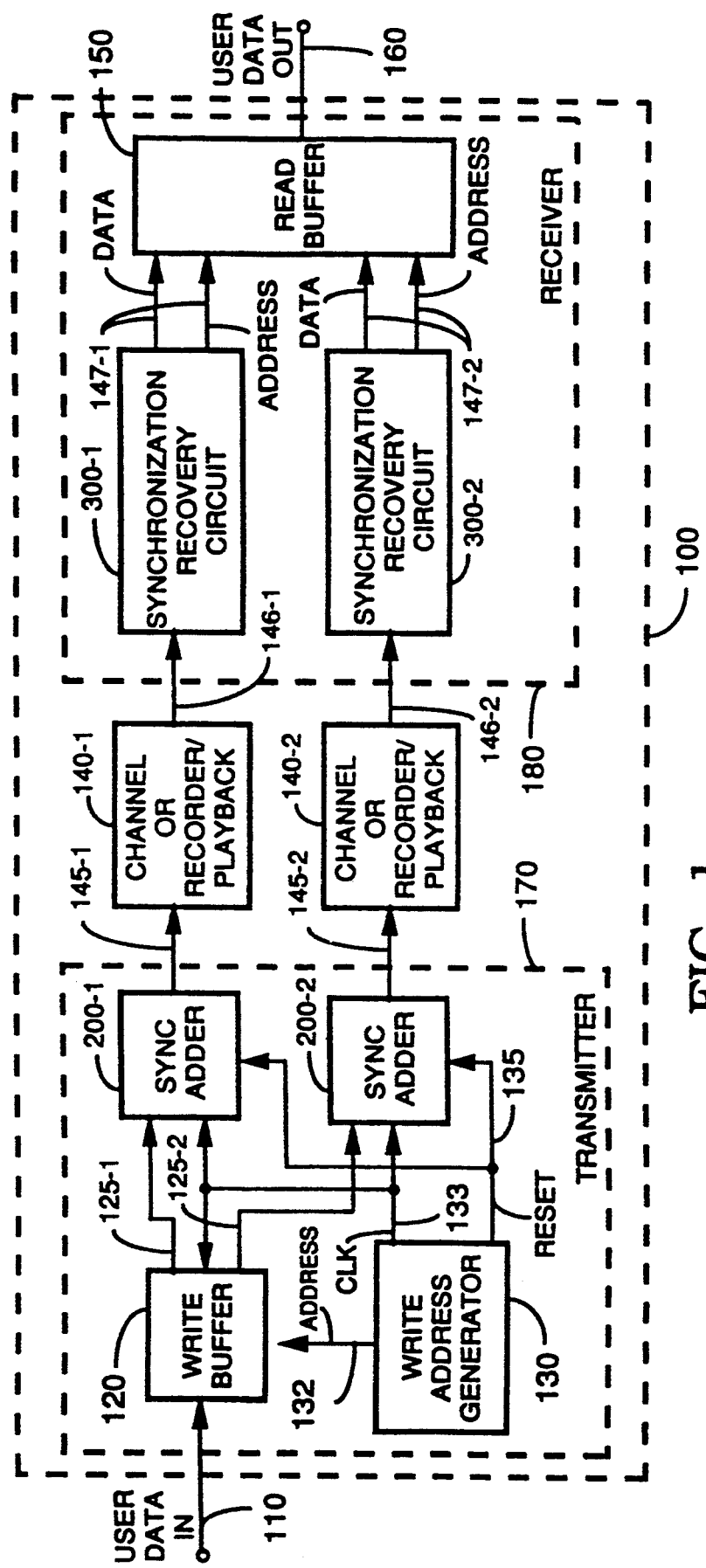
FIG. 1 is a schematic diagram of a synchronization system 100 which is useful is describing the principles of my invention.

Referring to FIG. 1, synchronization system 100 accepts user data input 110 in the form of data symbols and provides the parallel input data symbols across a data interface signal path to a write buffer 120 of transmitter 170. Here, we assume user data input 110 are provided as two data symbols of parallel digital data format that has been encoded by an error correction/detection arrangement, which is not shown. Each data symbol is assumed to be one eight-bit byte. The two data symbols that comprise user data input 110 may be from two different ECC codewords. The ECC codewords can be variable in length and, for example, can include 11 or 15 or 60 or, as was earlier mentioned, 100 or even some other number of data symbols which represent information symbols and/or ECC check symbols. To further illustrate the variable nature of the user data input 110, consider that write buffer 120 holds an ECC block of ECC codewords such as a plurality of Reed Solomon codewords. Each Reed Solomon codeword may include a plurality information symbols and/or check symbols. In that manner, Reed Solomon codewords, which are one form of user data input 110, are loaded into write buffer 120.

As an aside, in my illustrative embodiment, the size of an ECC block is assumed to conform to the size of a (compressed) television field, there typically being two television fields in one television frame. That means that the size of an ECC block comprises about 83,000 of the 33-bit sync words while the 33-bit sync words are hereinafter described as including four (4) symbols in each sync word. As is also described later on, the ECC block is transmitted either over a communications channel to a receiver or to a storage medium such as a digital video tape recorder for recording and later playback at the receiver (both communications channel and recorder/playback are shown in FIG. 1 as 140 while the receiver is shown as 180). My illustrative embodiment shows two paths from write buffer 120 so that alternate ones of the 33-bit sync words of the ECC block are provided, for example, over a respective path to a respective recorder channel for writing on respective tracks of the storage medium, for example, on the tracks of magnetic tape on a recorder. (Note that the two paths are more particularly described hereinafter.) In light of the above, a 525 line television frame has about 31,680 of the 33-bit sync words per field to be stored for (or written on) each of the two recorder channels while, for a 625 line television frame, there are about 41,680 of the 33-bit sync words per field to be stored for each of the two recorder channels. Those illustrative numbers include compressed video images as well as four audio channels, run up and edit gaps. Therefore a 16 bit binary number (e.g., $2^{16}-1=65,535$) is sufficiently large so as to uniquely identify each sync word in the field of a television image signal for each of the two paths.

Continuing, write buffer 120 in my illustrative embodiment uses dynamic random access memory (DRAM) technology and functions to temporarily buffer the user data input 110 as a block of 16-bit buffered words. The buffered words can be transferred from write buffer 120 (a) by way of a one path arrangement or, as is here shown, (b) by way of a two path arrangement or, for that matter, (c) by way of an $M_1$ path arrangement where $M_1$ could in theory be any non-zero positive integer. For purposes of illustration only, and not by way of limitation, the following description focuses on a two path arrangement. The first path of the two path arrangement comprises signal path 125-1, sync adder 200-1, signal path 145-1, communications channel or recorder/playback device both shown as 140-1, signal path 146-1, synchronization recovery circuit 300-1, and signal path 147-1 while the second path comprises signal path 125-2, sync adder 200-2, signal path 145-2, communications channel or recorder/playback device both shown as 140-2, signal path 146-2, synchronization recovery circuit 300-2, and signal path 147-2. It should be kept in mind that a substantially identical description occurs for both the first path and the second path. That being the case, the following description will drop the "-1" or the "-2" following the identifying reference numeral, it being clear that the description applies to either the first path (i.e. the -1 path) or the second path (i.e. the -2 path). For example, reference to sync adder 200 means that the description applies equally well to sync adder 200-1 or to sync adder 200-2, while reference to channel 140 means that the description applies equally well to communications channel or recorder/playback device both shown as 140-1 or to communications channel or recorder/playback device both shown as 140-2, etc.

The buffered words from an ECC block are read from write buffer 120 and are alternately transferred as follows: a buffered word to the first path (e.g. to the -1 path) and then a buffered word to the second path (e.g. to the -2 path) and then a buffered word to the first path, etc. This alternate reading of the buffered words from write buffer 120 is in response to signals from write address generator 130 and occurs so that symbols belonging to the same Reed Solomon codeword are temporally separated from each other and will be spatially separated on the communications channel or on the storage medium (both shown as 140). It may be worth mentioning that, in relation to the order of reading data from write buffer 120, it is more typical that about 4,000 codeword symbols intervene between symbols from the same codeword. A more specific description is given later. In any event, the capability of a Reed Solomon error corrector, not shown, to correct bursts of errors in the communications channel or errors caused by locally defective regions in the storage medium is thereby improved.

Write address generator 130 not only provides clocking signals CLK including bit clocking signal CLK3 and buffered word clocking signal CLK1 on signal path 133 to both write buffer 120 and sync adder 200 but also provides respectively an address signal on signal path 132 to write buffer 120 and a reset signal on signal path 135 to sync adder 200. The address signal on signal path 132 is for identifying the specific buffered word and is used for defining the order in which data are read from write buffer 120. The reset signal on signal path 135 is for resetting a pseudo-random number generator 800 within sync adder 200. Sync adder 200, in turn, converts the individual 16-bit buffered words, which comprise two bytes of input data symbols or two bytes of two Reed Solomon codeword symbols, into a four-byte, four-symbol 32-bit word, which we call a 32-bit sync word data field of a 33-bit sync word. In addition, by way of illustration and not by way of limitation, sync adder 200 appends a sync bit to each 32-bit sync word data field in the most significant bit (MSB) position to generate the 33-bit sync word that can, in my illustrative embodiment, be serially transmitted over signal path 145. To help visualize the above, consider the 33-bit sync word to be a left-to-right string of bits where the least significant bit (LSB) will be the left-most bit, called bit number zero, and counting left-to-right the most significant bit (MSB) will be the right-most bit, called bit number 32.

As to appending the sync bit, the reset signal on signal path 135 is for resetting a pseudo-random number generator 800 within sync adder 200. As will be made more clear later on, the pseudo-random number (PN) generator 800 is reset to an initial value P ($=P_0P_1P_2 \ldots P_{n-1}$ where it is later made clear that n=16) at the start of each ECC block. The initial value (here P=1 0 0 . . . 0) is read from P vector block 250 in response to a reset signal at the load input of PN generator 800. Thereafter a pseudo-random sync bit sequence is generated by pseudo-random number generator 800 in sync adder 200 of transmitter 170 in such a manner that the pseudo-random sequence can be re-generated by (a similar) pseudo-random number generator 800 in flywheel 700 of correlator network 400 of synchronization recovery circuit 300 of receiver 180.

In sync adder 200, pseudo-random number generator 800 provides the sequence of sync bits, which are respectively appended to a respective four-byte (that is, four-symbol) sync word data field (that is, appended to a 32-bit word) to form the 33-bit sync word. It may be noted that the discussion assumes that the pseudo-random sync bit is appended to the 32-bit sync word data field as the most significant bit (MSB) position of the thus formed 33-bit sync word. That is by way of illustration only and not by way of limitation, since the sync bit can be appended to, or inserted as, any bit position, for example, the sync bit could be inserted in such a manner as to shift higher or lower order bits of the sync word data field in any direction that a designer elects so as to generate the 33-bit sync word or for that matter a word of any predetermined length. Each 33-bit sync word is then parallel-to-serial converted by sync adder 200 to form a serial 33-bit sync word for transmission on signal path 145 in an ECC block comprising a plurality, for example, $M_2$ of the 33-bit sync words, which, in turn, is, for example, either (a) transmitted over a communications channel or (b) recorded on a storage medium such as a digital video tape recorder (both the communications channel and the storage medium are shown as 140) for subsequent reception at receiver 180.

Thus, in partial summary of the above, two symbols from the user data in 110 are received by sync adder 200 over signal path 125 by way of write buffer 120, which formats the two symbols as a 16-bit buffered word. Sync adder 200 generates 33-bit sync words by concatenating a PN generated sync bit and two of the 16-bit buffered words from write buffer 120. As a result, each 33-bit sync word includes (a) a plurality of data bits comprising the sync word data field and (b) the PN generated sync bit. The bits of the sync word data field are taken from signal path 125 in order of arrival, i.e., first-in-first-out (FIFO), and used to "fill out" the four-byte data field of the sync word. Then, sync adder 200 converts the sync words to a data stream comprising 33-bit serial sync words and sends the data stream to the recorder or communications channel 140. Certain caveats are now mentioned:

(a) It is not necessary that the sync word and sync word data field be 33 and 32 bits, respectively. The width of both the sync word and the sync word data field is a design option which is available to a person who may implement the principles of my invention. For example, a designer may choose to include additional symbols in the data field of the sync word, i.e. symbols over and above those of the 32-bit sync word data field;

(b) It is worth repeating that the sync bits of successive sync words are generated from the output sequence of pseudo-random (PN) sequence generator 800 in sync adder 200 of transmitter 170 and that, as was mentioned earlier but as will be made clearer later on, the sync bits of successive sync words are also reconstructed from the output sequence of pseudo-random (PN) sequence generator 800 in flywheel 700 of receiver 180 and that the reconstructed sync bits are compared with the sync bits received in the sync words of the data stream on signal path 145 during the process of recovering synchronization;

(c) PN generator 800 is initialized to a known PN state at the start of each ECC block (in my illustrative embodiment the initializing condition is the P vector provided by P vector block 250). Also, the length of the PN sequence is chosen such that it will not repeat in an ECC block. In my illustrative embodiment, the length of the PN sequence is chosen to be $(2^{16}-1=)65,535$;

(d) It ought to be noted that the word "state" as used herein refers to the "PN state" of the PN generator which produced the specific bit in the PN sequence which corresponds to the PN state. The "PN state" is the specific pattern of ones and zeroes in PN generator 800, shown in FIG. 8 That is, PN state is the pattern of ones and zeroes that is represented by $S_0, S_1, \ldots, S_{n-1}$ in FIG. 8. Hence, the PN state is a number between one and 65,535 in my illustrative embodiment. As will become clearer later on, a PN state of all zeroes has special meaning as an output of correlator 500 in FIG. 5;

(e) As a further aid in understanding the foregoing, one could conceptually view an ECC block as a two-dimensional rectangular matrix array with $M_2$ (an integer) rows (each row including a 33-bit sync word) and with 33 columns (each column including a bit from a corresponding bit position of a 33-bit sync word—meaning that in a row there are 33 columns). Then if one were to look from top-to-bottom down the column (or bit position) that includes the sync bit, one would see $M_2$ bits, which correspond to a portion of the output sequence of pseudo-random (PN) sequence generator 800. That PN output sequence, when detected, can be used to declare that ECC block synchronization exists and hence can be used in recovering synchronization;

(f) As a further aside, it now seems appropriate to mention something that will be made more clear later on; namely, receiver 180 includes synchronization recovery circuit 300 which conceptually does look from top-to-bottom down each of the 33 columns (or bit positions) of an ECC block in an effort to locate that column which contains the PN sequence and hence that column which includes the sync bits during synchronization recovery at the receiver; and (g) In the case of a communications channel, channel 140 includes sending modem, transmission medium and receiving modem and, in the case of a recording channel, channel 140 includes channel code encoder, record amplifier, record head, recording medium, play head, preamplifier, equalizer, data detector, clock recovery circuit, and channel code decoder.

With the foregoing in mind, channel 140 delivers serial data, which is possibly corrupted with errors, and clock signals CLK over signal path 146 to the synchronization recovery circuit 300. The clock signal to synchronization recovery circuit 300 has one tick per data bit and hence is really a bit clock signal CLK3, although bit slips are a possible kind of error. A bit slip occurs, for example, when clock and data get out of step—meaning out of synchronization.

Synchronization recovery circuit 300 of receiver 180 finds the boundaries of the sync words in its input data stream on signal path 146. Synchronization recovery circuit 300 does this by locating the position of the sync bits in the data stream on signal path 146. The sync bits can be located in the data stream because the sync bits form a PN sequence, which is determinable and which is capable of being re-generated or reconstructed. When the sync bit position is located, or discovered, the data stream can be assembled into 33-bit sync words and their sync word data fields can be disassembled into Reed Solomon coded symbols. What is more, since, as was mentioned earlier, the PN sequence does not repeat in the ECC block, the position of the sync bit in the PN sequence, i.e. the PN state, corresponds to, and provides an identity to, and can be used to generate a read buffer address for the position into which the ECC symbol is to be written in read buffer 150.

In partial summary of the above, a serial data stream, which includes a plurality of 33-bit sync words, is received from a communications channel or read from a playback device (both the communications channel and the playback device are shown as 140) and provided to synchronization recovery circuit 300:

(a) where the serial data undergoes a serial-to-parallel conversion;
(b) where the sync bits are located, or discovered;
(c) where synchronization is recovered;
(d) where sync words are located;
(e) where the sync word data field is extracted from the sync word;
(f) where ECC symbols are extracted from the sync word data field; and
(g) where the ECC symbols and their respective addresses are provided over signal path 147 for writing of the symbols into read buffer 150 by using the PN state to generate the address within read buffer 150.

The read buffer 150 then outputs the buffered ECC symbols in codeword order as user data out 160, which can be provided to an ECC decoder, not shown, as properly formed codewords. Then, on the one hand, those symbols from the data stream, which are error free, are in their respective synchronized positions while, on the other hand, those symbols from the data stream, which are not error free and possibly whose positions cannot be determined, can be corrected of any detected errors in the user data. Thereupon either the error free symbols or the error corrected symbols, as the case may be, are provided to any suitable apparatus, not shown, such as a compression system to restore data to a form adaptable for use with television monitor or other equipment capable of using the digital user data.

Note that in the above partial summary the description was in terms of ECC symbols whereas the earlier description was in terms of buffered words. The change in language was done to further point out that buffered words comprise a plurality of ECC data symbols and here, for purposes of illustration only and not by way of limitation, buffered words are assumed to include two ECC symbols where each ECC data symbol comprises one eight-bit byte.

Sync Adder 200

Figure 2:
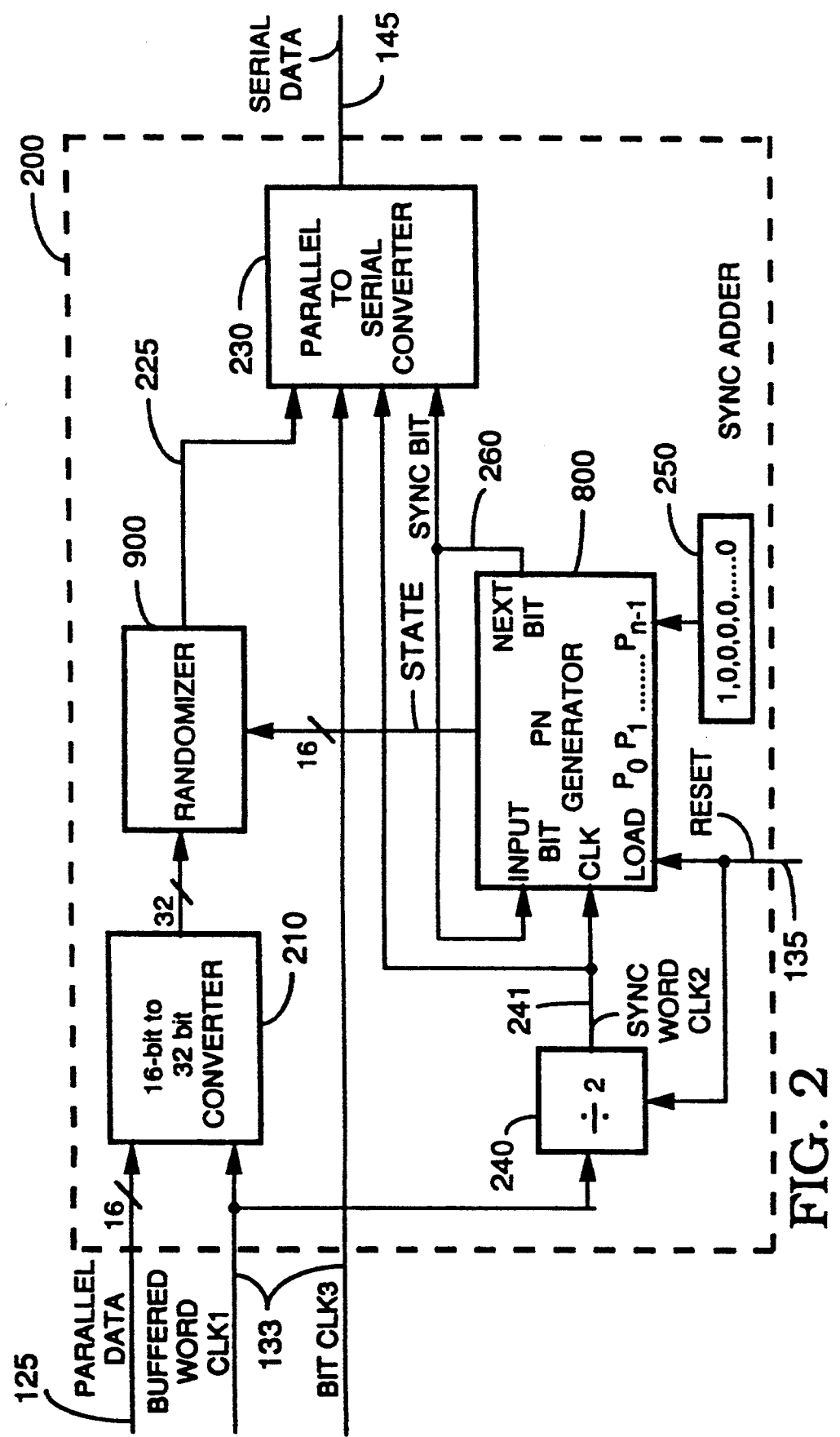
FIG. 2 is a schematic diagram of a synchronization adder 200 which is of a type usable in the synchronization system of FIG. 1 and which is useful in describing the principles of my invention.

Referring now to FIG. 2, there is shown in schematic form illustrative apparatus for sync adder 200 which is usable in the system structure shown in FIG. 1. In particular, the n-bit parallel buffered word data (here for purposes of illustration and not by way of limitation a [n=]16-bit parallel buffered word data is assumed on signal path 125) are converted by 16-bit-to-32-bit converter 210 to a 32-bit sync word data field in response to buffered word clocking signals CLK1 on signal path 133 from write address generator 130. Sync adder 200 also includes pseudo-random number (PN) generator 800. PN generator 800 is initialized at the start of an ECC block by loading a 16-bit P vector where $P = P_0 P_1 P_2 \ldots P_{n-1}$ as shown in P vector block 250 in response to a reset signal on signal path 135, which reset signal is provided to the load input of PN generator 800. The P vector in block 250 has its least significant bit being a logical one and has its remaining 15 higher significant bits being logical zeroes, that is, $P = 1\ 0\ 0\ ..\ .\ 0$. PN generator 800 then provides a pseudo-random sync bit over signal path 260 to parallel-to-serial converter 230, which appends, or concatenates, the sync bit as the most significant bit (MSB) to the 32-bit sync word data field (which itself may or may not be randomized by randomizer 900 (see also FIG. 9)) to generate the 33-bit sync word, all in response to a sync word clock signal CLK2 on signal path 241. Sync word clock signal CLK2 is provided by divide circuit 240, which is also reset in response to a reset signal on signal path 135, to PN generator 800 and to parallel-to-serial converter 230 in response to buffered word clock signal CLK1 and, specifically, upon detection of every two buffered words (and is equivalent to providing a clock pulse upon detecting the 32 bits of data on signal path 125).

Randomizer 900, which is shown in greater detail in FIG. 9 and which is discussed in greater detail later on, can use the PN state of the PN generator 800, which state corresponds to the position of the sync word within an ECC block, to generate a relatively long randomization sequence for randomizing the sync word data field output of converter 210. A de-randomizer 900 in receiver 180, which is the inverse of randomizer 900 in transmitter 170, can be embodied in synchronization recovery circuit 300 where the same PN state can be used to re-generate the sync word data field at receiver 180 from the randomized sync word data field at transmitter 170. An advantage of a relatively long randomization sequence is that it is less likely to otherwise appear in the data stream and hence is less likely to be "defeated" by the data stream itself.

As an aside, here we assume for purposes of illustration and not by way of limitation that the parallel, buffered word on signal path 125 comprises two ECC data symbols (hence $n=16$ bits) where each ECC symbol is represented by an eight-bit byte. It is illustrative that the size of the sync word data field be an integer multiple of the buffered word size and it is illustrative that buffered word size be an integer multiple of the Reed Solomon code symbol size. Here we have assumed the Reed Solomon code symbol size to be an eight-bit byte. Hence we have selected the buffered word size to be 16-bits and we have selected the size of the sync word data field to be 32-bits and we have chosen that the sync bit be appended to the sync word data field as the most significant bit in forming the 33-bit sync word. Clearly, other sizes are possible and other selection criteria may be employed. However, whenever the mentioned integer multiple relationship does not hold, then the implementation can be expected to be more complex than that of my embodiment.

Continuing, pseudo-random number generator 800 and divide circuitry 240 are reset in response to a reset signal over signal path 135 from write address generator 130. The reset signal is provided at the start of each ECC block so that PN generator 800 is initialized with the P vector from block 250. Also, the number of pseudo-random numbers generated by PN generator 800 is sufficiently high before a repeat of the generated PN sequence pattern occurs so that the PN sequence does not repeat in an ECC block. In my embodiment, pseudo-random number generator 800 generates at least $(2^{16}-1=)$ 65,535 pseudo-random numbers before it repeats and, as was noted above, there are some 83,000 of the 33-bit words in an ECC block and half (which is less than 65,535) are processed by the first path (i.e. the aforementioned "-1" path) whereas the other half (also less than 65,535) are processed by the second path (i.e. the aforementioned "-2" path).

The pseudo-random sync bit is appended, or concatenated, to the 32-bit sync word data field provided by converter 210 (which 32-bit sync word data field may or may not be randomized by randomizer 900 in response to the PN state from PN generator 800). Whether or not randomized by randomizer 900, the 32-bit sync word data field is then provided over signal path 225 to parallel-to-serial converter 230 where the pseudo-randomly generated sync bit is appended to it to form a 33-bit sync word. The serial 33-bit sync word is then provided by converter 230 over signal path 145 to the communications channel or storage medium (both shown as 140). Advantages that are obtained when a pseudo-randomly generated sync bit is appended to the 32-bit sync word data field as opposed, for example, to appending an alternating logic one and logic zero to the 32-bit sync word data field, include:

(a) since the pseudo-randomly generated sync bit pattern does not repeat within an ECC block, the pseudo-random sync pattern gives rise to two functions:

one, it functions as a unique and identifiable sync pattern and two, it functions as a unique identifier of a sync word in an ECC block. That is, the position of the sync bit in the non-repeating sync pattern corresponds to the position of the sync word in the ECC block and hence the sync bit in the non-repeating sync pattern can be used to generate an address for writing that sync word into read buffer 150;

(b) by inserting one sync bit every 33 bits instead of periodically inserting a special multibit sync codeword, sync recovery can begin at any 33-bit boundary which reduces sync recovery latency;

(c) there is no longer the need for a special multibit sync word to be particularly defined and hence there is no longer a non-allowed bit pattern in the information communicated between transmitter 170 and receiver 180, which in turn means that the signal path between transmitter 170 and receiver 180 is independent of the particular code being transmitted; and (d) it becomes relatively easy to use a range of sync bits (for example, a range of 32 or more consecutive sync bits) to develop a high confidence that synchronization has been recovered while at the same time avoiding the need for a non-allowed bit pattern in the information. On the other hand, if a non-allowed bit pattern were used, it should be pointed out that spurious sync patterns can exist in the data stream. Therefore, if a non-allowed bit pattern were used, a spurious sync pattern could lead to false indication of synchronization being recovered. Note again that randomizer 900 is inserted in path 225 between converters 210 and 230 at transmitter 170. Randomizer 900, responsive to the state of PN generator 800, which PN state also corresponds to the position of the sync word within an ECC block, randomizes the 32-bit sync word data field before extending it to converter 230. Such randomizing of the 32-bit sync word data field offers advantages which include:

(a) randomization of the sync word data field would tend to "break up" long repetitive patterns for which the transmission or recording channel 140 may have a pattern sensitivity (meaning a sensitivity toward patterns for which the channel performance would likely be worse than average) and (b) randomization would remove structure that may exist in the user input data since, for example, such structure typically interferes with magnetic tape head servomechanism devices that rely on signal amplitude when reading a magnetic tape.

Synchronization Recovery Circuit 300

Figure 3:
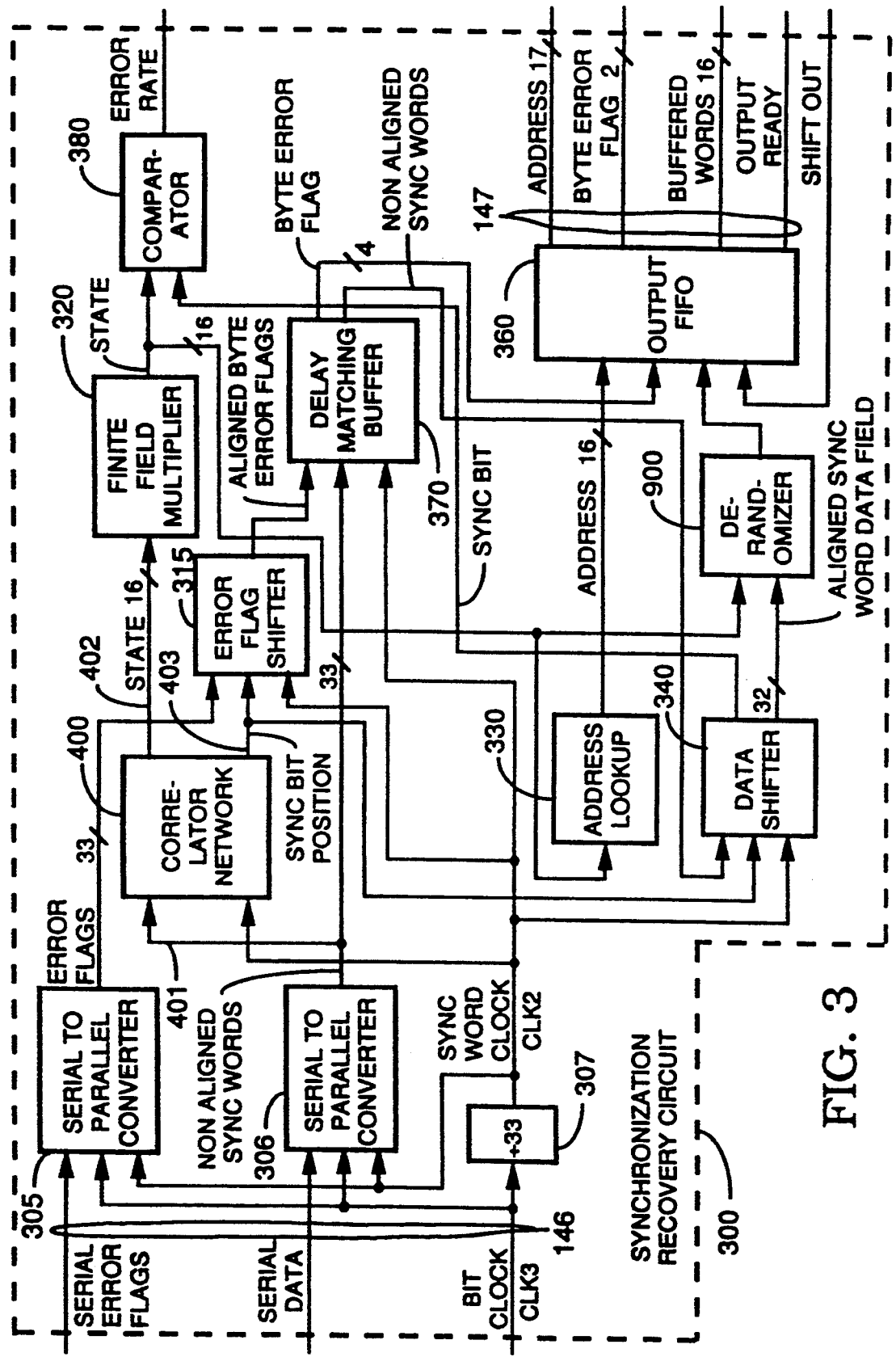
FIG. 3 is a schematic diagram of a synchronization recovery circuit 300 which is of a type usable in the synchronization system 100 of FIG. 1 and which is useful in describing the principles of my invention.

Referring now to FIG. 3, there is shown in schematic form illustrative apparatus for a synchronization recovery circuit 300 which is usable in receiver 180 of the system 100 structure shown in FIG. 1. In particular, the 33-bit sync words are received from the communications channel or read from a playback device in serial form (both the communications channel and the playback device are shown as 140) and provided over signal path 146 to synchronization recovery circuit 300:

(a) where the information undergoes a serial-to-parallel conversion;

(b) where synchronization is recovered;

(c) where the sync words are aligned;

(d) where the sync word data field is extracted from the sync word;

(e) where the ECC codewords are extracted from the sync word data field; and (f) where the ECC codewords and their respective address locations are provided over signal path 147 to read buffer 150.

The read buffer 150 then buffers the ECC blocks and supplies the codewords as user data out 160 to the ECC decoder, not shown, and thereafter, to any suitable apparatus, not shown, such as a compression system to restore the data symbols to a form adaptable for use with, for example, a television monitor or other equipment capable of using the digital user data.

Among the meaningful functions of synchronization recovery circuit 300 is the function of properly positioning the data symbols in a read buffer 150 containing ECC codewords before the ECC codewords are sent to the ECC decoder, which is not shown. An alternative statement of that function is the function of placing or writing the buffered words into read buffer 150 so that the buffered words occupy positions that correspond to those held by the buffered words in write buffer 120. Yet another alternative statement of that function is the function of mapping an ECC block from write buffer 120 into read buffer 150 during the presence of errors in the data as well as during the presence of missing data.

In implementing that function, it needs to be remembered that the serial data on signal path 146 may or may not be aligned. Accordingly, to recover synchronization, the serial data, whether it is aligned or is not aligned, is assumed to be non-aligned. Non-aligned data including any non-aligned 33-bit sync words on signal path 146 are serial-to-parallel converted by converter 306. The parallel format non-aligned 33-bit sync words are provided over signal path 401 to correlator network 400 for determining the sync bit position and the state of the PN sequence, which as mentioned corresponds to the sync bit position, in response to a sync word clock signal CLK2 from divide circuit 307. Correlator network 400, which will described in more detail later, checks each bit position of the non-aligned 33-bit sync word to determine which of the 33 possible phases, or bit positions, is "most likely" to contain the pseudo-random sync bit that had been appended to the sync word data field by sync adder 200 at the transmitter 170. The bit position that is "most likely" to contain the sync bit is provided over signal path 403 jointly to error flag shifter 315 and data shifter 340 as the sync bit position while the state of the PN sequence at that bit position is provided over signal path 402 to finite field multiplier 320.

Since correlator network 400 checks each bit position of the non-aligned 33-bit sync word to find the sync bit position and since each bit position of many such non-aligned 33-bit sync words (many is in my illustrative embodiment taken to be 32 sync words but clearly is a design parameter which can be different in different alternative embodiments) are typically checked in order for the correlator network 400 to develop a confidence in its selection of the "most likely" sync bit, the process of locating the sync bit position introduces a delay with respect to the data. For example, assume that correlator network provides an output signal indicating that the sync bit position had been located. Then, if due to errors in the data stream, the sync bit position were to "change" then that "change" would be evident at the output of correlator 400 at a later point in time. In my illustrative embodiment, correlator network 400 introduces a delay which is equivalent to about 32 sync words.

To compensate for the delay introduced by correlator network 400, delay matching buffer 370 introduces a matching delay in the data path 401 (from converter 306) of the non-aligned sync word as it moves through synchronization recovery circuit 300. This matching delay assures that the sync bit position and the PN state at the output of correlator network 400 are derived from the sync bits associated with the non-aligned sync words at the output of delay matching buffer 370. The delayed, non-aligned sync words are provided from delay matching buffer 370 to data shifter 340. In response to the sync bit position from correlator network 400 and sync word clock CLK2, data shifter 340 locates the "aligned" sync word in two consecutive non-aligned sync words and shifts the sync word into proper alignment. The sync word data field of the thusly aligned sync word is then provided from data shifter 340 to de-randomizer 900 along with the PN state from finite field multiplier 320 so that, in the sync word data field had been randomized by sync adder 200 at transmitter 170, then the sync word data field can be de-randomized by synchronizer recovery circuit 300 at receiver 180.

It is also worth mentioning that, if channel 140 has error detection capability, then serial error flags are also provided on signal path 146, are serial-to-parallel converted by converter 305, and in parallel format are provided to error flag shifter 315. The error flags are used to flag each bit of the serial data which is suspected to be is error.

Now let us turn to a more particular description of synchronizer recovery circuit 300 as it receives serial data and serial error flags from signal path 146 and processes that information to align sync words and to recover synchronization. From the serial data, synchronizer recovery circuit 300 forms and aligns sync words using a bit rate clock signal CLK3 and serial error flags all of which are received from channel 140 over signal path 146. The error flags provide an indication from channel 140 that a corresponding bit in the serial data stream on channel 140 is likely to be in error. The error flags are used to flag Reed Solomon symbols that are likely to be in error and to thereby increase the correction capability of the Reed Solomon decoder, not shown. The bit clock signal CLK3 is divided in circuit 307 by the number of bits comprising the sync word (i.e. in this example by 33) to generate a sync word clock signal CLK2. The sync words and the error flags from signal path 146 are serial-to-parallel converted by converters 306 and 305 respectively into respective words which are the same length as the 33-bit sync words. These same length "sync words" may or may not be actual sync words because they may or may not be properly aligned. For example, if the words which purport to represent sync words are not properly aligned, they may contain partial data fields from two successive sync words which are separated by a sync bit. In reality, the non-aligned sync words are simply a group, or set, of 33 consecutive bits and an object is to locate a sync bit out of the set of 33 bits. Accordingly, since it is not then known whether a sync word is or is not aligned, it is assumed that consecutive ones of 33-bit sync words are non-aligned sync words. The problem then to be solved in recovering synchronization is to properly align the non-aligned 33-bit sync words from the converted serial data stream on signal path 146 so that they do indeed correspond to aligned 33-bit sync words and then to determine where the data symbols from the sync words are to be written in the read buffer 150.

To do the foregoing, the serial data on signal path 146 becomes parallel data at the output of converter 306. The parallel output of non-aligned sync words are fed from converter 306 over signal path 401 to correlator network 400. Correlator network 400 checks each bit position in the non-aligned sync words to determine which bit position is "most likely" to contain the sync bit from the PN sequence that was inserted by sync adder 200. The position of the sync bit and the state of the PN sequence at that bit position are outputs from correlator network 400. Functionally, correlator network 400 looks at all of the 33 bit positions of each of the non-aligned 33-bit sync words that are provided at its input to develop confidence in its choice of the sync bit position. Within correlator network 400, each hereinafter described correlator 500 looks at a plurality of input bits (i.e. there is one correlator for each of the 33 input bit positions and that correlator looks at the same bit position in a plurality of the non-aligned sync words that are presented at its input) to determine whether the bit sequence at the input of the correlator 500 is or is not from the PN sequence that was appended by sync adder 200.

As implemented in my illustrative embodiment, correlator network 400 introduces a delay equivalent to about 32 sync words. To compensate, or offset, that delay, delay matching buffer 370 inserts an equivalent matching delay in the sync word data path. The offsetting delay assures that the sync bit position and the PN state at the output of the correlator network 400 are derived from the sync bits associated with the data at the output of the delay matching buffer 370. The delayed, yet non-aligned, sync words are then fed from the delay matching buffer 370 to the data shifter 340. Data shifter 340 uses the sync bit position information to locate a sync word in two consecutive non-aligned "sync words" and shifts the located sync word into proper alignment in response to sync word clock signal CLK2. The 32-bit sync word data field is then output as an aligned sync word data field to the de-randomizer 900, if one is used, where it is de-randomized in response to the PN state from finite field multiplier 320 and then provided to output FIFO 360, if one is used. Output FIFO 360 in turn extends the ECC codewords over signal path 147 to read buffer 150.

The serial error flags on signal path 146 become parallel error flags at the output of converter 305 and, in response to the sync bit position output from correlator network 400, are shifted by error flag shifter 315 into correctly aligned locations before being inputted to the delay matching buffer 370. If any bit in a byte (which as earlier mentioned is the size that is assumed for purposes of illustration to be the size of a Reed Solomon symbol) is flagged as being in error, an error flag for that byte is generated. Therefore, a one bit error flag can indicate whether a byte is or is not in error. Since, as mentioned, there are four bytes in a sync word, the error flag for a sync word is here a four-bit error flag, a respective one of the four error flag bits being associated with a respective one of the four sync word bytes. The four-bit error flag is provided from error flag shifter 315 into delay matching buffer 370. This is an implementation compromise so as to reduce the size of the matching delay for the flags from a delay equivalent to 32 33-bit error flag words to a delay equivalent to 32 four-bit byte error flag words. The compromise may, however, cause some error flags to be associated with the wrong data symbol when synchronization is first achieved.

The non-aligned 33-bit sync words, after delay matching buffer 370 inserts an equivalent matching delay of 32 sync words in the sync word data path to compensate for the delay introduced by correlator network 400, are provided to data shifter 340. Note that the bit in the PN sequence identified by PN state output of the correlator network 400 corresponds correctly to the sync bit in the sync word. That is, the PN state output of correlator network 400 is a 16-bit identifier or address, which is in one-to-one correspondence with the particular sync bit in the PN sequence that was generated in, and appended by, sync adder 200. The state output of correlator network 400 is provided to finite field multiplier 320. Note also that delay matching buffer 370 does not offset any delay in the state output with respect to the data. Delaying the state would undo the good done by the matching delay 370. The correct state corresponding to the delayed data can be predicted without significant delay by multiplying the PN state by the power of a primitive element corresponding to the number of bits by which the sync words are delayed, e.g., by the element in the Galois Field corresponding to the delay. This is done in the finite field multiplier 320. The properly timed PN state can then be used by de-randomizer 900 in synchronization circuit 300 to generate the same randomizer pattern that was applied to the sync word data field by randomizer 900 in sync adder 200. The randomizer pattern is exclusive OR-ed in de-randomizer 900 with the aligned sync word data field at the output of the data shifter 340 for de-randomizing the sync word data field.

Figure 7:
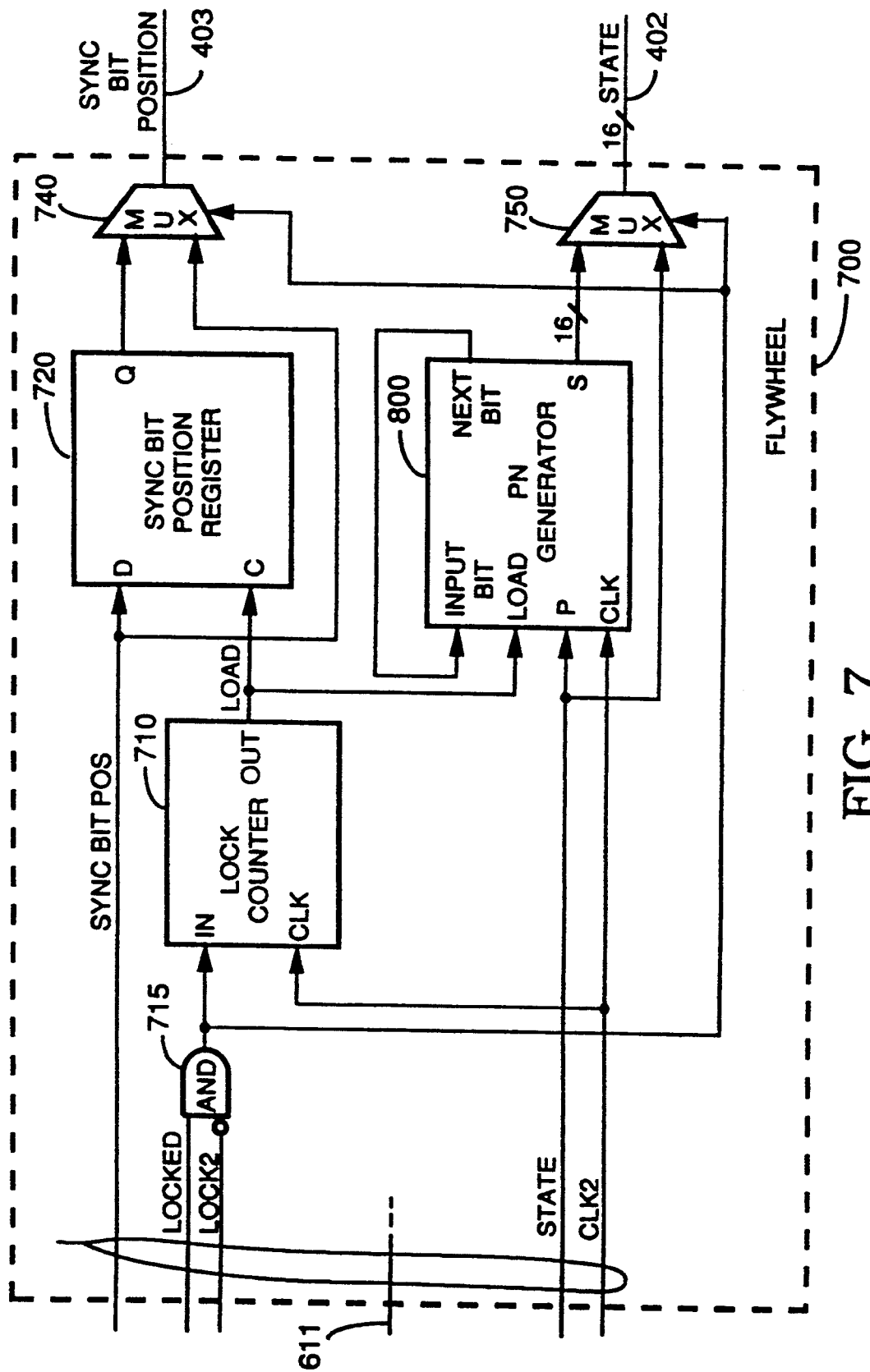
FIG. 7 is a schematic diagram of a flywheel 700 which is of a type usable in the correlator network 400 of FIG. 4 and which is useful in describing the principles of my invention.

Recall that the PN generator 800 in the sync adder 200 is initialized at the start of each ECC block. That is, PN generator 800 is reset at the start of an ECC block by providing the 16-bit P vector from block 250 so that the P vector ($=P_0, P_1, P_2, \ldots, P_{n-1}$) has a LSB bit being a logical one and all other bits being a logical zero, i.e. $P=1, 0, 0, \ldots, 0$. In that manner a known PN sequence can be generated for each ECC block at transmitter 170. A problem then is to reconstruct that PN sequence at receiver 180. A solution to that problem will be made clearer in connection with a detailed description the PN generator 800 used in flywheel 700 as shown in FIG. 7.

Since the PN generator 800 in the sync adder 200 of transmitter 170 is initialized at the start of each ECC block, then a substantially identical PN generator 800 can be embodied in flywheel 700 of correlator network 400 of synchronization recovery circuit 300 of receiver 180 to generate the PN state upon locating the sync bit from the serial data on signal path 146. In response thereto, there can be a mapping in synchronization recovery circuit 300 of receiver 180 from the PN state to the read buffer address for writing the buffered words of each sync word in the read buffer 150. (Remember that a sync word includes two buffered words.) The read buffer address corresponding to each PN state is looked up in an address lookup table 330, which can be a read-only-memory (ROM). The read buffer address, the de-randomized sync word data field, and the error flags are loaded into the output FIFO 360 to allow rate matching between off-tape, or received clock signal, to local system dock signal. The data is removed from the output FIFO 360 one buffered word at a time and provided over signal path 147 to read buffer 150 in response to a shift out signal from the read buffer. In the present implementation an additional address bit is appended by the output FIFO 360 (making for a 17-bit address). Thereby it is possible to distinguish between the two buffered words in the sync word. Also a two-bit byte error flag (there being two symbols in a buffered word) rather than the four-bit byte error flag (which accounted for the four symbols in a sync word data field) are provided by output FIFO 360.

Error Rate Measurement

Another function performed by synchronization recovery circuit 300 is one of providing a measure of the error rate of the data on channel 140. Now a description of an embodiment of error rate measurement.

Generally, the error rate can be measured by comparing the difference between the received PN sequence, as read from the received data stream on signal path 140, and the reconstructed PN sequence, as generated by the PN generator at the receiver 180.

First, as was earlier mentioned, the non-aligned sync words are provided from delay matching buffer 370 to data shifter 340. In response to the sync bit position from correlator network 400 and sync word clock CLK2, data shifter 340 locates the sync bits in two consecutive non-aligned sync words and shifts the sync words into proper alignment. That is, data shifter 340 synchronously aligns two or more data words in the data stream and locates a sync bit between the aligned data words. Having located the sync bit, data shifter 340 extends the sync bit to a first input of comparator 380.

Second, as was also earlier mentioned, on the one hand, correlator network 400 provides the sync bit position 403 and the PN state 402. On the other hand, the PN state corresponding to the delayed data can be predicted without significant delay by multiplying the PN state on signal path 402 by the power of a primitive element corresponding to the number of bits by which the sync words are delayed, e.g., by the element in the Galois Field corresponding to the delay. This is done in the finite field multiplier 320. A 16-bit predicted PN state output from finite field multiplier 320 is jointly provided to inputs of address lookup memory 330, de-randomizer 900 and to a second input of comparator 380.

Third, as will be more clear later on with respect to the description of PN generator/detector 800 in FIG. 8, the MSB of the PN state, which is labeled $S_{n-1}$ and which is also labeled as the NEXT BIT output of PN generator/detector 800, is a bit from the PN sequence and is also the predicted value of the sync bit when synchronization is recovered. Using that relationship, it becomes clear that, when finite field multiplier 320 provides the PN state to the second input of comparator 380, the predicted sync bit, which is the MSB of that PN state, is also provided to the second input of comparator 380.

Accordingly, comparator 380 compares its first input, which is the sync bit from data shifter 340, and its second input, which is the MSB of the PN state from finite field multiplier 320. If the comparison shows that there is a difference between the sync bit from data shifter 340 and that MSB of the PN state from finite field multiplier 320, then there is an error in the sync bit position which means that there is an error in the data stream on signal path 146. If there is no difference, then there is no error in the data stream. Accordingly, a measure of the relative sameness or the relative difference can be provided from comparator 380 as a measure of the error rate. That is, the error rate measuring apparatus, responsive to the comparison of the first received sync bits and the second predicted sync bits, provides a signal indicating a relation between the differences between the first and the second sync bits. In that manner, comparator 380 provides the function of generating a measure of the error rate in the data stream.

Correlator Netork 400

Figure 4A:
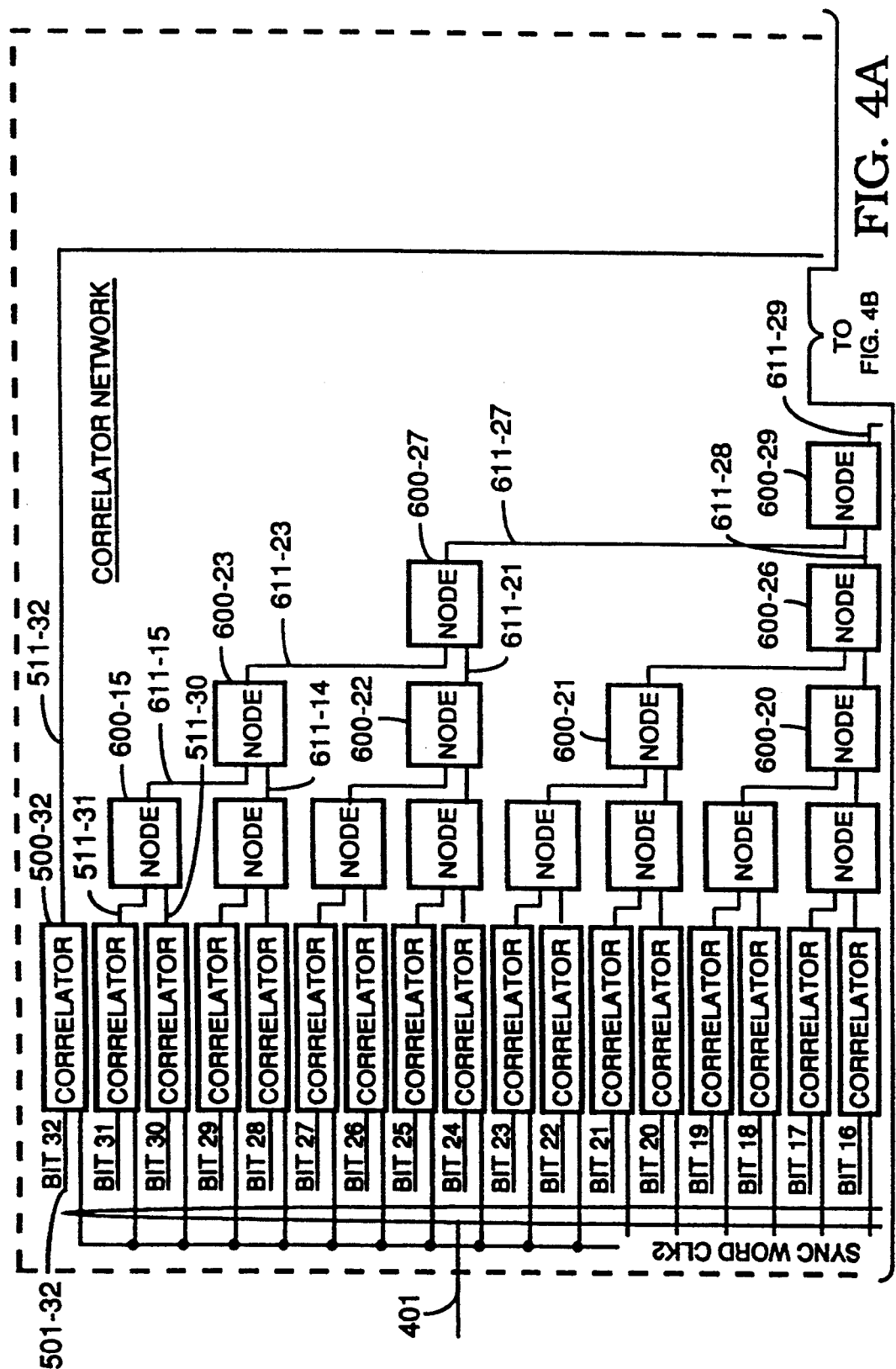
FIG. 4 is a schematic diagram comprising FIGS. 4A and 4B which show a correlator network 400 which is of a type usable in the synchronization recovery circuit 300 of FIG. 3 and which is useful in describing the principles of my invention.

Refer now to FIGS. 4A and 4B, which are herein collectively referred to as FIG. 4. Broadly, there is shown in schematic form an illustrative correlator network 400 which is of a type usable in the synchronization recovery circuit 300 of FIG. 3. As mentioned earlier, the non-aligned 33-bit sync words are provided from serial-to-parallel converter 306 over signal path 401 to correlator network 400, which, in response to a sync word clock signal CLK2 from divide circuit 307, locates the sync bit position among a plurality of non-aligned 33-bit sync words and provides the PN state for that sync bit position. Correlator network 400 through a combination of correlators 500-0 to 500-32, correlator network nodes 600-0 to 600-31, and flywheel 700 checks each of the 33 bit positions of a plurality of the non-aligned 33-bit sync words to determine which of the 33 possible phases, or bit positions, is "most likely" to contain the pseudo-random sync bit. The bit position that is "most likely" to contain the sync bit is provided over signal path 403 jointly to error flag shifter 315 and data shifter 340 as the sync bit position while the state of the PN sequence for that sync bit position is provided over signal path 402 to finite field multiplier 320.

Although other criteria could be used, for our purposes, "most likely" is a measure that takes the following issues into account.

First, the probability of a "false" lock of a single correlator 500 in correlator network 400 is about 1-in-2000. What is meant by "lock?" Operationally, each correlator 500, which is broadly shown in FIG. 4 and which is more particularly shown in FIG. 5, may at any time be either "locked" or "unlocked". A correlator 500 corresponds to a single bit of a 33-bit non-aligned sync word. Therefore, there are 33 correlators for a sync word. A correlator 500 is said to be "locked" if the sequence of bits read by that correlator from a corresponding sequence of non-aligned sync words matches a sub-sequence of the PN sequence; otherwise, the correlator is to be "unlocked." Therefore, since, as will soon be explained, there are 33 correlators 500 in correlator network 400 (i.e. $2^5 + 1$ correlators) and since, in my illustrative embodiment, counters in the soon to be described correlators require the input bit position to match the bits of the PN sequence for sixteen (16) consecutive non-aligned sync words before lock is declared, then the probability of a false "lock" is approximately $2^5/2^{16}$ or $\frac{1}{2}^{11}$ or about 1-in-2000.

Second, the probability of loading a false value of the sync bit position into flywheel 700 is approximately $\frac{1}{2}^{11+n}$ where $n=16$ in my illustrative embodiment.

Within correlator network 400, there are correlators 500, nodes 600 and flywheel 700. Each is soon to be described—correlators 500 with the aid of FIG. 5, nodes 600 with the aid of FIG. 6 and flywheel 700 with the aid of FIG. 7.

Figure 5:
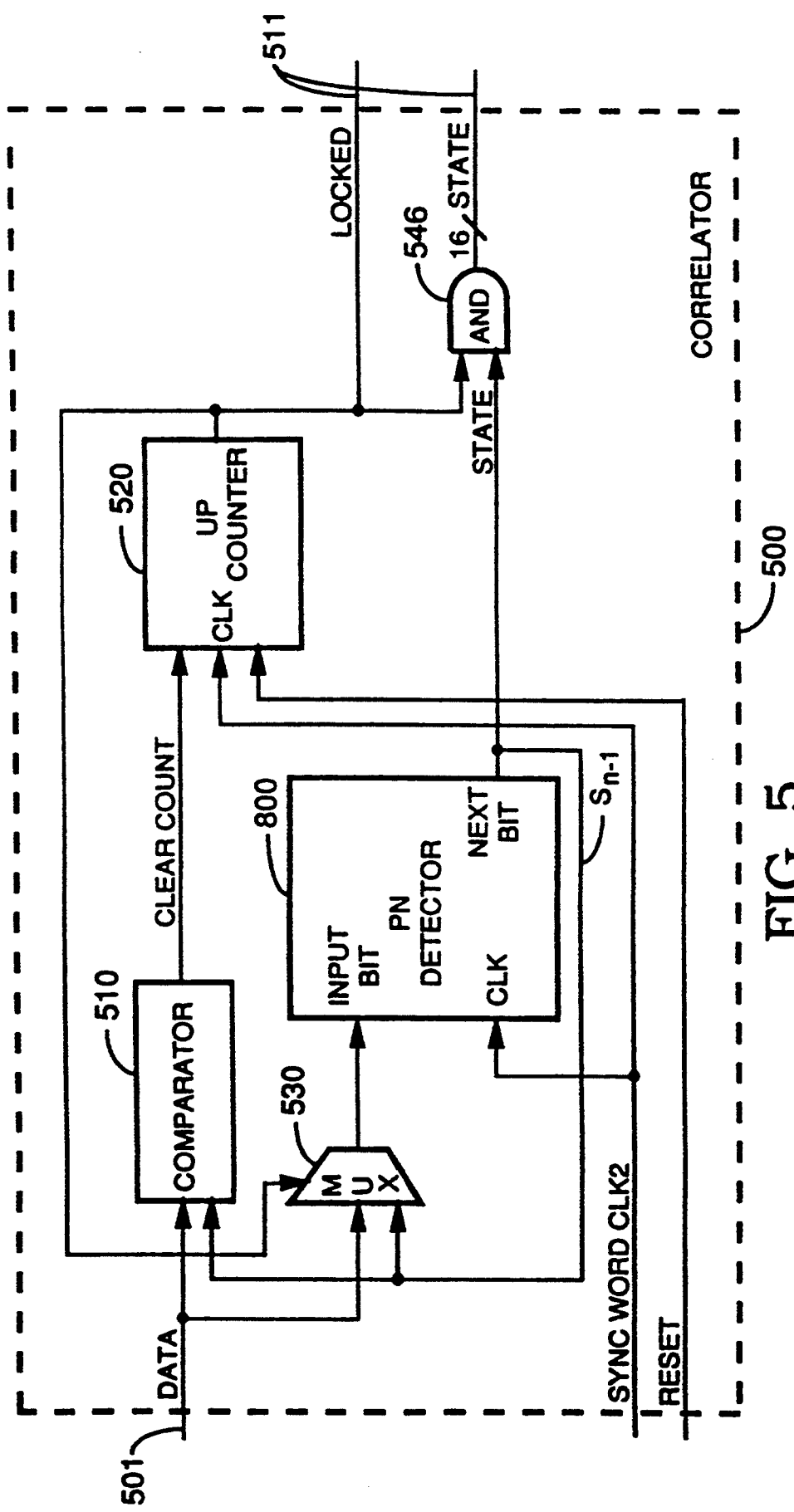
FIG. 5 is a schematic diagram of a correlator 500 which is of a type usable in the correlator network 400 of FIG. 4 and which is useful in describing the principles of my invention.

Correlator 500 of FIG. 5 generally performs the function of determining whether a sequence of bits in a bit position of a 33-bit non-aligned sync word matches a sub-sequence of the PN sequence and, if there is a match, correlator 500 provides the state of the PN generator and a "lock" signal indicating that a match occurred. To accomplish these functions, each correlator 500 looks at a plurality of bits and, more precisely, each correlator 500 looks at a single bit position for a plurality of non-aligned sync words. In particular, (a) each of the 33-bits of a non-aligned sync word is provided to a respective one-bit input of a respective correlator 500 and (b) each respective one of the 33 correlators 500 (again one correlator per bit for each of the 33-bits of a 33-bit non-aligned sync word) looks at the same bit position in a plurality of non-aligned sync words that are provided to the input of a correlator. As noted earlier, this is conceptually analogous to having each correlator 500 look from top-to-bottom down a column (or bit position) of one of the 33-bits to locate the bit position which includes the sync bit. When the sync bit position is discovered, one would see $M_2$ bits, which correspond to a portion, or a sub-sequence, of the output sequence of pseudo-random (PN) sequence generator 800, in that bit position.

Figure 6:
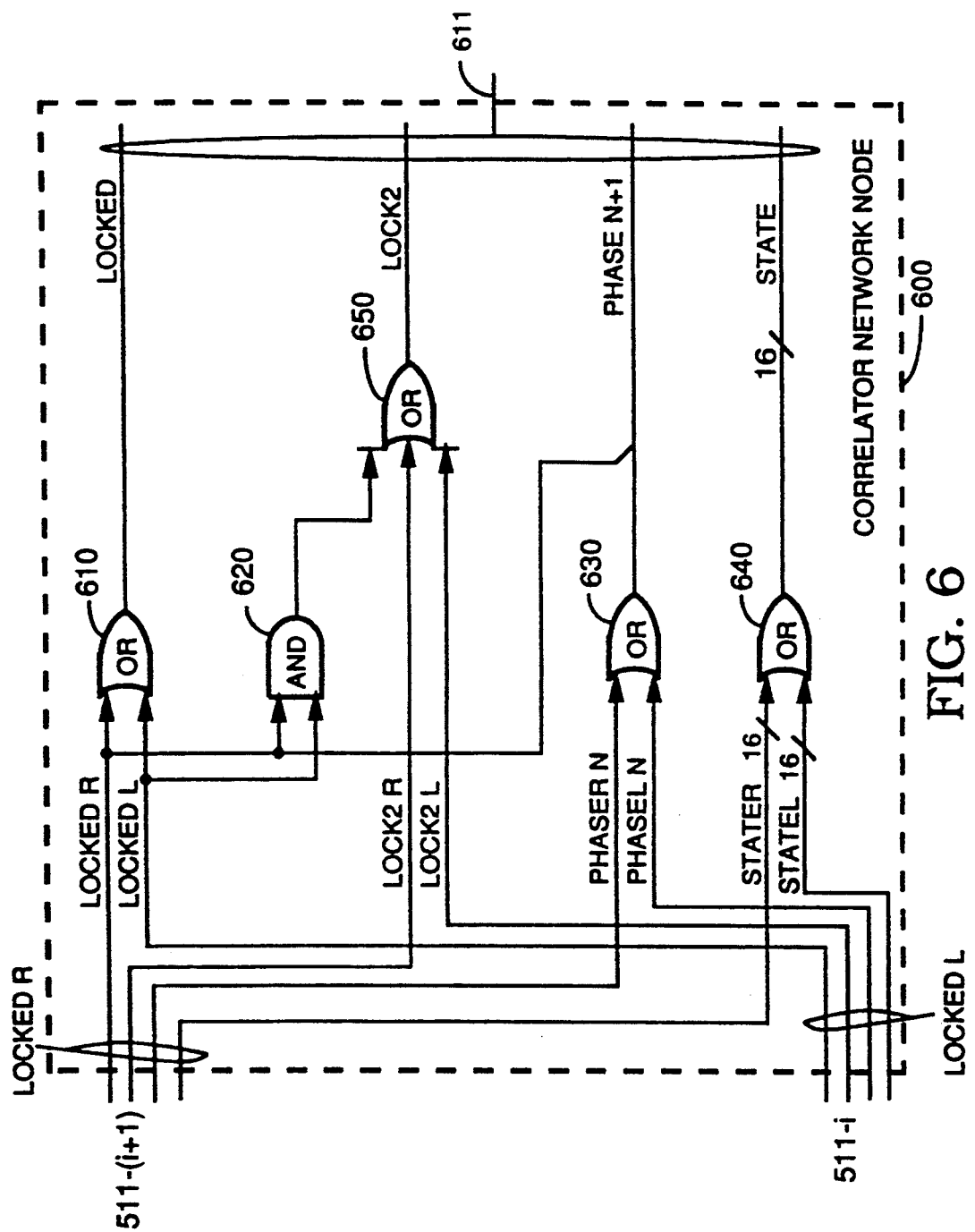
FIG. 6 is a schematic diagram of a correlator network node 600 which is of a type usable in the correlator network 400 of FIG. 4 and which is useful in describing the principles of my invention.

Correlator network node 600 of FIG. 6 generally performs the function of passing the sync bit position and the PN state from one of the node's two inputs to the node's output. In that manner, node 600 passes the sync bit position and the PN state of a locked correlator 500 in correlator network 400 to flywheel 700. In addition, the network 400 of nodes 600 determines when exactly one of correlator 500 is locked.

Flywheel 700 of FIG. 7 generally performs the function of continuing to provide the sync bit position and the PN state which were priorly determined when exactly one correlator was locked. That previous determination of sync bit position and PN state then continues to be provided as an output from correlator network 400 when the condition that not exactly one correlator is "locked" prevails.

Generally in the correlator network 400 of FIG. 4, each respective bit of a non-aligned 33-bit sync word is provided in parallel format over signal path 401 and then over a respective signal path 501-0 to 501-32 to a single-bit first input of a respective correlator 500-0 to 500-32. One structure for a correlator 500 is the structure shown in FIG. 5 and that structure will be described shortly. A second input to each respective correlator 500-0 to 500-32 is the sync word clock signal CLK2 from divide circuit 307. A pair of signals, called respectively the "locked" output and the PN state output, are provided from bit-wise adjacent, or consecutive, correlators 500-i and 500-(i+1) over respective signal paths 511-i and 511-(i +1) to respective ones of a first round of correlator network nodes 600-0 to node 600-15. As an example, a locked output and a PN state output are provided from correlator 500-0 over signal path 511-0 to correlator network node 600-0 whereas a locked output and a PN state output are provided from correlator 500-1 over signal path 511-1 to correlator network node 600-1. Outputs 611-0 to 611-15 of the first round of nodes 600-0 to node 600-15 are provided to as inputs to a second round of nodes 600-16 to 600-23. Outputs 611-16 to 611-23 from the second round of nodes 600-16 to 600-23 are provided as inputs to a third round of nodes 600-24 through 600-27. Outputs 611-24 to 611-27 of the third round of nodes 600-24 through 600-27 are provided as inputs to a fourth round of nodes 600-28 and 600-29 with a fifth round through node 600-30 and a final round through node 600-31, which is used since the sync word is assumed to be 33 bits and the number 33 is not a power of the binary base two. Finally, an output of node 600-31 is provided through flywheel 700, which is also described later. A first output of flywheel 700, which is provided over signal path 403 as the sync bit position signal, is the bit position that is "most likely" to contain the sync bit. A second output of flywheel 700, which is provided over signal path 402, is the state of the PN sequence at that "most likely" sync bit position.

Now recall some earlier definitions. Recall that, a correlator 500 is said to be "locked" if a sequence of bits read by that correlator from a consecutive sequence of non-aligned sync words matches a sub-sequence of the PN sequence; otherwise, the correlator is to be "unlocked." Also recall that in the convention used in this description, bit position 0 is the least significant bit (LSB) and (a) bit 31 for a 32-bit sync word data field or (b) bit 32 for a 33-bit sync word, respectively, is the most significant bit (MSB). Further, lower significant bits are said to be to the left of higher significant bits and higher significant bits are said to be to the right of lower significant bits.

With the above definitions in mind, correlator network 400 has a respective correlator 500-0 to 500-32 for each bit position in a non-aligned 33-bit sync word. Each respective correlator 500 accepts its respective single data bit input from signal path 401 from a respective signal path 501-0 to 501-32 in response to sync word clock signal CLK2. Correlators 500-0 to 500-32 are arranged in FIG. 4 as the leaves of a binary tree of correlator nodes 600 leading to a common root correlator node 600-31. One function of the network of correlator nodes 600-0 to 600-31 is one of determining if and when exactly one correlator is locked. When exactly one correlator is locked, it corresponds to the current "most likely" bit position for the sync bit. A second function of the network of nodes 600-0 to 600-31 is one of determining: (event a) if and when no correlators are locked and (event b) if and when more than one correlator is locked. If either event (a) or event (b) is determined to occur, then previously determined values for the sync bit position and the PN state are provided at the output of correlator network 400. The previously determined values for the sync bit position and the PN state are those values of the sync bit and the PN state that were determined when exactly one correlator 500 was last locked within correlator network 400. Those previously determined values for the sync bit position and the PN state are stored in, and read from, flywheel 700 as will become clear from the following description.

New values for the sync bit position and the PN state are loaded from the root node 600-31 into the flywheel 700 when lock has been continuously stable for a predetermined number of sync words. Lock counter 710 in flywheel 700 is used in determining when lock has been continuously stable for a predetermined number of sync words. The predetermined number is chosen to give a reasonable confidence that the lock is not a spurious lock. In my illustrative embodiment, the predetermined number of sync words is chosen to be 16. As noted earlier, that predetermined number 16 is equivalent, in the illustrative embodiment described herein, to saying that the likelihood of incorrectly determining the sync bit position is about 1-in-2000 or $1$-in-$2^{11}$. Thus the probability of incorrectly setting the flywheel 700 when the correct correlator 500 is unlocked due to errors is $1$-in-$2^{11+16}$, or $1$-in-$2^{27}$.

Flywheel 700 in FIG. 7 receives the sync bit position over signal path 611-32 and provides the sync bit position both to a D input of flip-flop sync bit register 720 and to an input of multiplexer 740. Flywheel 700 also includes a PN generator 800 (also see FIG. 8) into which is stored (through its P input from signal path 611-32) the PN state of the locked correlator, as received through the network of nodes 600 comprising correlator network 400. The PN state of the locked correlator is also provided to an input of multiplexer 750. The PN state of the locked correlator and the sync bit position at the root of the tree of nodes, i.e. at node 600-31, are outputted from flywheel 700 respectively on signal paths 402 and 403 whenever exactly one correlator is locked, both in response to AND gate 715 providing an activate signal to multiplexers 750 and 740, respectively, upon detecting a locked correlator (LOCKED is a logical one) and upon detecting the absence of more than one correlator being locked (LOCK2 is a logical zero). Otherwise the flywheel PN state and sync bit position stored respectively in PN generator 800 and sync bit position register 720 are outputted as the previously determined values from flywheel 700 respectively on signal paths 402 and 403. Again, (a) if no correlators are locked or (b) if more than one correlator is locked, then previously determined values for the sync bit position and the PN state are used. Those previously determined values for the sync bit position and PN state are those stored in, and read from, sync bit position register 720 and PN generator 800, respectively, within flywheel 700.

Correlator 500

Referring now to FIG. 5, there is shown in schematic form an illustrative correlator 500 which is of a type usable in the correlator network 400 of FIG. 4. As mentioned, functions of correlator 500 include the function of determining whether a sequence of bits in a specific bit position of a plurality of non-aligned sync words matches a sub-sequence of the PN sequence and, if there is match, the function of identifying the state of the PN generator when the match occurs and the function of providing the PN state as an output signal to signal path 511.

As an aside, pseudo-random (PN) detector 800 as used in the correlator 500 of FIG. 5 is substantially identical to PN generator 800 as used in FIGS. 2 and 7. The structure of PN generator/detector 800 is more particularly shown in FIG. 8. PN generator/detector 800 in FIGS. 2 and 7 functions as a PN generator when its next bit output is fedback to its input bit input whereas PN generator/detector 800 in FIG. 5 functions as a PN detector without that feedback loop. However, note that the structure of PN generator/detector 800 is substantially identical in all three uses.

Continuing, a data bit to be tested in the process of locating a sync bit is one of the 33-bits of a non-aligned sync word. The question to be answered is "Which one of the 33-bits of a non-aligned sync word is the sync bit?" Toward answering that question, the data bit to be tested is, in FIG. 5, provided from signal path 501 to a first data input of comparator 510 as well as through a first input of multiplexer 530. An output of multiplexer 530 is provided to the INPUT BIT input of PN detector 800 in response to an active output signal from up counter 520. The NEXT BIT $S_{n-1}$ output of PN detector 800, which is the MSB of the PN state, is fedback jointly to a second input of comparator 510 and a second input of multiplexer 530. The data bit on signal path 501 and the MSB, or $S_{n-1}$ bit, output of PN detector 800 are compared by comparator 510. If the data on signal path 501 is a part of the PN sequence, the input data on signal path 501 will be equal to the feedback $S_{n-1}$ bit after the first data bit on signal path 501 has propagated to the end of the shift register in PN detector 800 as its output $S_{n-1}$ bit. This event occurs because the PN sequence is generated by a PN detector 800 in correlator 500 of receiver 180 and PN detector 800 in correlator 500 is similar to PN generator 800 in sync adder 200 of transmitter 170.

Up counter 520 is incremented in response to the data bit on signal path 501 and the feedback $S_{n-1}$ bit being equal and up counter 520 is reset to zero, or the count is cleared, in response to the data bit on signal path 501 and the fedback $S_{n-1}$ bit being different. That is, the up counter 520 is cleared when the input data and feedback bits are different. When up counter 520 reaches a predefined threshold, in this case a threshold count of 16, "locked" is asserted and so signaled on signal path 511. That means that, for the specific correlator 500 in question, at least 16 consecutive 33-bit words had been read from the data stream on signal path 401 and the non-aligned sync words had a sub-sequence from the PN sequence in the bit position to -which the specific correlator that asserted "locked" was assigned. When "locked" is asserted, the feedback signal is fed from an output of PN detector 800 through the second input of multiplexer 530 into an INPUT BIT input of the PN detector 800, which has the effect of converting PN detector 800 into a PN generator 800 since its next bit output becomes fedback to its input bit input.

As an aside, the use of feedback from PN detector 800 to comparator 510 and multiplexer 530 is not a requirement in the practice of the principles of my invention but it does allow the correlator 500 to tolerate some errors without losing lock and at the same time it does allow for maintaining the same PN sequence in the PN detector 800 when there is an error in the data. For example, in the illustrative embodiment that is described, "locked" is de-asserted when the data bit on signal path 501 and the feedback bit $S_{n-1}$ are different and the up counter 520 value is less than 16. Thus one sync bit error can be tolerated in a 16 sync word span without losing "locked" status.

Continuing, the state of PN detector 800 is bit wise logically AND-ed by AND gate 546 with the "locked" bit signal, which is provided from up counter 520 as the locked signal to signal path 511 as well as to an input of AND gate 546. Thus, on the one hand, when a correlator 500 is locked, correlator 500 outputs both a "locked" (active) bit signal (a logical one being an active signal and a logical zero being a not active signal) and the PN state on signal path 511 to the binary tree of nodes 600-0 to 600-31 and, on the other hand, when a correlator 500 is not locked, correlator 500 outputs both an "unlocked" (not active) bit signal and the PN state on signal path 511; however, then when the PN state bits are AND-ed to generate a PN state, the output of AND gate 546 comprises all logical zeros.

In partial summary of correlator 500 in FIG. 5, PN detector 800 predicts the next bit in the PN sequence based on the previous 16 input bits; comparator 510 compares the input data bit to the predicted next bit and generates a clear count signal for up counter 520 when the two bits do not match; and multiplexer 530 selects the input data bit 501 or the predicted next bit from the PN detector 800 depending respectively on whether up counter 520 indicates an "unlocked" or a "locked" condition.

Correlator Network Node 600

Referring now to FIG. 6, there is shown in schematic form an illustrative correlator network node 600 which is of a type usable in the correlator network 400 of FIG. 4. As mentioned, nodes 600 of correlator network 400 function to, among other things, determine (a) whether there are no correlators locked or (b) whether there is exactly one correlator locked or (c) whether there is more than one correlator locked.

A function of the binary tree 400 (FIG. 4) of correlators 500 (FIG. 5) and nodes 600 (FIG. 6) is to determine when exactly one correlator is locked and to output the state of the locked correlator and the position of the correlator in the binary tree, which is equivalent to identifying the sync bit position as well as equivalent to the identifying the state of the PN sequence.

Now consider how correlator network node 600 operates. A first node input is called the left (L) input and is labeled 511-i, and a second node input is called the right (R) input and is labeled 511-(i+1). As mentioned earlier, the words left and right are a helpful convention that is used in this description and are by way of illustration only and not by way of limitation. In any event, node 600 operates as follows in determining, or locating, the sync bit position and the state of the PN sequence:

(i) For a given node 600, at least one of its inputs is locked if its left input (the LOCKEDL signal is active (logical one) on signal path 511-i) is locked OR if its right input (the LOCKEDR signal is active on the 511-(i+1) signal path) is locked. That determination is made by OR gate 610 and is signaled over signal path 611 as a LOCKED signal (logical one being active and logical zero being not active);

(ii) For a given node, more than one of its inputs is locked if its left input (the LOCKEDL signal is active on signal path 511-i) AND its right input (the LOCKEDR signal is active on the 511-(i+1) signal path) are both locked. That determination is made by AND gate 620 and is signaled as an input to OR gate 650;

(iii) For a given node, more than one correlator is locked to the left, which is signaled at the left input when the LOCK2L signal is active on signal path 511-i, OR more than one correlator is locked to the right, which is signaled at the right input when the LOCK2R signal is active on the 511-(i+1) signal path, OR more than one lock is detected at the present node, which is signaled at the output of AND gate 620. That determination is made by OR gate 650 and is signaled over signal path 611 as a LOCK2 signal;

(iv) Thus at the root of the tree, which here is shown to be node 600-31, if the LOCKED output on signal path 611-32 is active and if the LOCK2 output on signal path 611-32 is not active then there is exactly one correlator which is locked;

(v) Assume that the state output of a correlator (a) is all logic zeroes when the correlator is unlocked and (b) represents the PN state when the correlator is locked. Then, if there is exactly one correlator which is locked, the state of the locked correlator is, using logic mathematics, the bit wise logical OR-ing of the states of all the correlator outputs, since the state output of a correlator is set to zero if the correlator is unlocked, i.e. not locked. That determination is made by OR gate 640 and is signaled over signal path 611 as a STATE signal;

(vi) Similarly, if there is only one locked correlator 500, then only the left bit position or the right bit position but not both positions is non-zero at the node input 511, so the output sync bit position can be the bit wise logical OR of the node inputs with the addition of a new bit in the MSB position which is simply the right locked signal LOCKEDR; and (vii) Note that in the first round of nodes 600-0 to 600-15 that, since there is no sync bit position to input, the right locked signal is output to the next node as the sync bit position PHASEN+1. In this way, when there is exactly one locked correlator, each bit in the sync bit position indicates whether the lock came from the left or the right at one level of the tree, and thus is a binary coding of the position of the locked correlator.

Flywheel 700

Referring now to FIG. 7, there is shown in schematic form an illustrative flywheel 700 which is of a type usable in the correlator network 400 of FIG. 4. Flywheel 700 provides stable synchronization information during times when the correlator network 400 does not indicate that exactly one correlator is locked. On the one hand, when exactly one correlator is locked, flywheel 700 provides the current sync bit position and the current PN state. On the other hand, when either no correlators are locked or when more than one correlator is clocked, flywheel 700 provides the previous sync bit position when exactly one correlator was last detected as "locked as well as a PN sequence that is generated in response to an initializing of a PN generator 800 in flywheel 700 to a PN state equal to the PN state that was previously determined when exactly one correlator was last "locked."

As noted above, correlator network nodes 600 including node 600-31 provides LOCKED, LOCK2, PHASE N+I and STATE signals to signal paths 611 including to signal path 611-32 from correlator network node 600-31. When LOCKED is active (logical one) and when LOCK2 in not active (logical zero), AND gate 715 of flywheel 700 enables the lock counter 710 to increment in response to a word sync clock signals CLK2; otherwise lock counter 710 is reset to zero. When lock counter 710 is incremented for, in my illustrative embodiment, sixteen (16) consecutive word sync clock signals CLK2, it is concluded, or determined, that exactly one lock has occurred for a predetermined number of cycles, in this case, by way of illustration only and not by way of limitation, a predetermined number of sixteen (16) cycles, whereupon lock counter 710 issues a load signal jointly to the C input of flip-flop sync bit position register 720 and the LOAD input of PN generator 800 in flywheel 700.

The current value of the sync bit position is loaded jointly into sync bit position register 720 through its D input from the root node 600-31 over signal path 611-32 as well as to a first input of multiplexer 740. The sync bit position is extended through multiplexer 740 as the sync bit position to signal path 403 while the PN state on signal path 611-32 is extended through a first input of multiplexer 750 as the PN state signal on signal path 402, both being done in response to an active (logical one) output of AND gate 715.

In response to an inactive (logical zero) output of AND gate 715, the previous value of the sync bit position is provided from the Q output of sync bit position register 720 through a second input of multiplexer 740 to signal path 403 while a PN state, which is derived from the previous value of the PN state and which updated in response to word sync clock signals CLK2 at the CLK input of PN generator 800, is provided from PN generator 800 through a second input of multiplexer 750 as the PN state signal on signal path 402.

The current value of the state and sync bit position from the node network from root node 600-31 are respectively also loaded into flywheel 700 over signal path 611-32 and therein to its PN generator 800 as its P vector input and, as earlier mentioned, to sync bit position register 720, respectively in response to a load signal at the LOAD input of PN generator 800 and to the C input of sync bit position register 720.

Thereafter, when there is not exactly one correlator locked, flywheel 700 provides the previous values of sync bit position and PN state, which were stored in sync bit position register 720 and which were generated in PN generator 800 based on a previous initializing PN state, i. e. the PN state when there was previously exactly one correlator locked, and those values are used within synchronization recovery circuit 300 instead of the values from the node network output.

PN Generator/Detector 800

Figure 8:
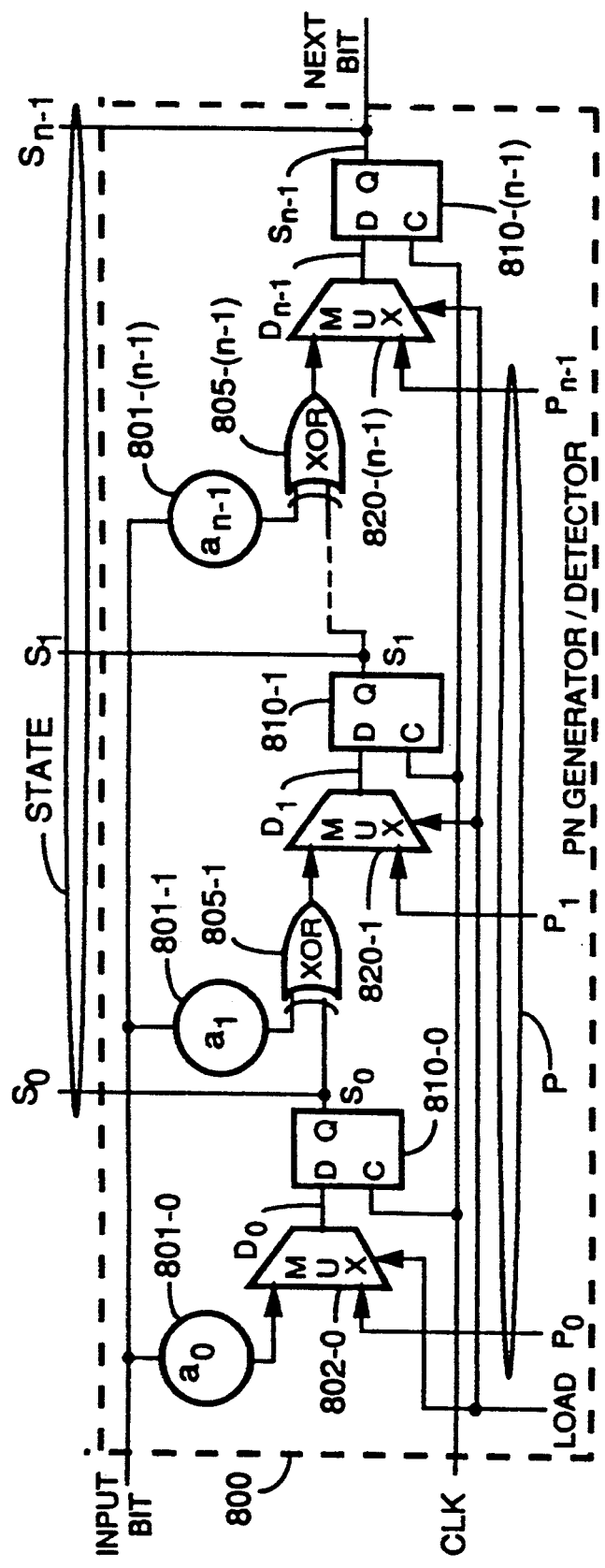
FIG. 8 is a schematic diagram of a PN generator/detector 800 which is of a type usable as the PN generator 800 in the sync adder 200 of FIG. 2, as the PN detector 800 in the correlator 500 of FIG. 5, and as the PN generator 800 in the flywheel 700 of FIG. 7 and which is useful in describing the principles of my invention.

Referring now to FIG. 8, there is shown in schematic form an illustrative PN generator/detector 800 which is of a type usable as the PN generator 800 in the sync adder 200 (FIG. 2), as the PN detector 800 in correlator 500 (FIG. 5), and as the PN generator 800 in flywheel 700 (FIG. 7) of correlator network 400 (FIG. 4).

FIG. 8 shows illustrative hardware for generating and detecting PN sequences. As earlier mentioned, feeding back the next bit $S_{n-1}$ output to the input bit input enables PN generator/detector 800 to function as a PN generator; otherwise it normally functions as a PN detector.

Functionally, PN generator/detector 800 operates as a shift register. The illustrative embodiment of PN generator/detector 800 in FIG. 8 provides a means for loading a state P vector having an initial value $P_0$ to $P_{n-1}$ where n=16 in my illustrative embodiment under control of an activate, or reset, signal at its load input. When PN generator/detector 800 is not being loaded, i.e. when its load input is not active, the state $S_{i-1}$ within PN generator/detector 800 advances to a new state by loading each next consecutive flip-flop 810-i through its D input with the output of exclusive OR 805-i. The inputs to exclusive OR 805-i are the state bit signal $S_{i-1}$, which is the state of the previous flip-flop 810-(i-1), and the input bit input to the PN generator/detector 800 after that input bit is multiplied by prefixed coefficient $a_i$ where coefficients $a_0$ to $a_{15}$ form a primitive polynomial of degree n (=16) over Galois field GF(2). Since the coefficients $a_i$ are over GF(2), here over a binary field, they have values of either 0 or 1. Thus if coefficient $a_i$ is 1, the input bit input is connected to the input of the exclusive OR gate 805-i at PN stage i whereas if coefficient $a_i$ is 0, then there is no input bit connection at stage i and the exclusive OR gate 805-i may be omitted with the state $S_{i-1}$ being connected directly to the multiplexer 802-i at the input of stage i. It should be noted that, for all primitive polynomials, coefficient $a_i$ is 1 so that the input bit to PN generator/detector 800 will always be connected to PN stage (i=) 0. Also note that coefficient $a_n$ which is always 1 for a polynomial of degree n (=16) is not used in the circuit of PN generator/detector 800.

When the next bit output of PN generator/detector 800 is fed back to the input, then PN generator/detector 800 generates a PN sequence. That is the connection shown for PN generator 800 both in sync adder 200 and in flywheel 700. If a PN sequence generated from the same primitive polynomial is provided from an external source at the input, after n cycles, the next bit will always be the same as the input. That is the connection shown for PN detector in correlator 500. In this way the same circuit of PN generator/detector 800 may be used to both generate and to detect a PN sequence.

Randomizer/De-randomizer 900

Figure 9:
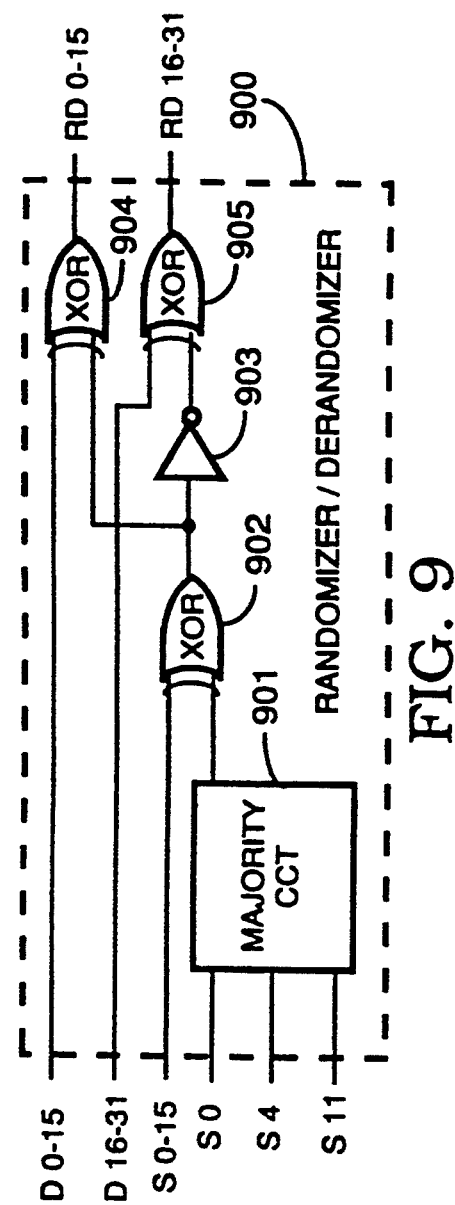
FIG. 9 is a schematic diagram of a randomizer/derandomizer 900 which is of a type usable in the sync adder 200 of FIG. 2 and in the synchronization recovery circuit 300 of FIG. 3 and which is useful in describing the principles of my invention.

Referring now to FIG. 9, there is shown in schematic form an illustrative randomizer/de-randomizer 900 which is of a type usable as randomizer 900 in the sync adder 200 (FIG. 2) and as de-randomizer 900 in synchronization recovery circuit 300 (FIG. 3).

The randomizing sequence of randomizer 900 in sync adder 200 is a sequence of words that are exclusive OR-ed (904, 905) with the 32-bit sync word data field (sync words data bits D0-15 by exclusive OR 904 to provide randomized sync word data bits RD0-15 and sync words data bits D16-31 by exclusive OR 905 to provide randomized sync word data bits RD16-31) whereas the de-randomizing sequence of de-randomizer 900 in sync recovery circuit 300 is a sequence of words that are exclusive OR-ed (904, 905) with the randomized 32-bit sync word data field (randomized sync words data bits D0-15 by exclusive OR 904 to provide de-randomized sync word data bits RD0-15 and randomized sync words data bits D16-31 by exclusive OR 905 to provide de-randomized sync word data bits RD16-31) for the purpose of randomizing and de-randomizing the data.

It is desirable for the randomizing sequence to be long, but the sequence should not correlate with the PN sequence used for the sync bit otherwise false synchronization would be likely. It is also desirable for the randomizer to have about the same number of ones as zeros and to change about as often as the PN sequence. Also, the randomizing sequence used by randomizer 900 in sync adder 200 in must be available to de-randomizer 900 in sync recovery circuit 300 for de-randomization.

In my illustrative embodiment, the randomizing sequence used by randomizer 900 in sync adder 200 is derived from the PN state used for the sync bits as this state is also available in the sync recovery circuit 300. For the primitive polynomial used in the PN sequence $(x^{16}+x^{12}+x^3+x+1)$, the majority of state bits $S_0$, $S_4$, and $S_{11}$ as input to majority circuit 901 (a) has a low correlation to the PN sequence and (b) has about the same number of ones as zeros and (c) changes about as often as the PN sequence. The output of the majority gate 901 is then exclusive OR-ed 902 with the PN state from the PN generator 800 in sync adder 200 or the finite field multiplier 320 in sync recovery circuit 300. The output signal from exclusive OR 902 is used as the randomizing sequence and is provided as the second input to exclusive OR 904 and its complement as the second input to exclusive OR 905.

The foregoing description of the principles of my invention is by way of illustration only and not by way of limitation. For example, although several illustrative embodiments of a synchronization recovery circuit in accordance with the principles of my invention have been shown and described, other alternative embodiments are possible and would be clear to one skilled in the art upon an understanding of the principles of my invention. Certainly the principles of my invention have utility apart from synchronizing digital video signals. For example, the synchronizing of any signal that may be found in a communications system, for example, could benefit from the application of the principles of my invention. Accordingly, the scope of my invention is to be limited only by the appended claims.

What is claimed is:

1. A synchronization recovery system comprising:
   means for associating a state of a transmitter pseudorandom (PN) generator with a data location in a write buffer;
   means for associating a state of a receiver PN detector with a data location in a read buffer;
   the transmitter PN generator and the receiver PN detector each being respectively adapted for generating and detecting a common PN sequence;
   means for appending a bit from a PN sequence output of the transmitter PN generator to data read from a write buffer data location to generate a sync word;
   means for receiving the generated sync word;
   means responsive the PN sequence from the receiver PN detector for locating the appended PN sequence bit in the received sync word;
   means for determining a PN state corresponding to the appended PN bit from the PN sequence in the received sync word; and
   means responsive to the determined PN state for associating the PN state of the received sync word with a data location in the read buffer.

2. The system defined in claim 1 further comprising:
   means responsive to the determined PN state for aligning word boundaries of the received sync word with respect to the location of the appended PN sequence bit within the PN sequence.

3. The system defined in claims 1 or 2 wherein the means for associating the PN state of the received sync word with a data location in the read buffer comprises:
   means for associating the state of the PN sequence with data locations in the read buffer so that data from the received sync word can be written into locations in the read buffer which correspond to locations the data occupied in the write buffer.

4. The system defined in claims 1 or 2 wherein the means for associating the PN state of the received sync word with a data location in the read buffer further comprises:

means for resetting the transmitter PN generator to an initial state prior to reading the first data location from the write buffer, and
   means for advancing the state of the transmitter PN generator prior to the reading of each subsequent write buffer location.

5. The system defined in claim 3 wherein the means for associating the state of the PN sequence with data locations between the write buffer and the read buffer comprises:

means for looking up the read buffer address corresponding to state of the PN sequence in a memory table.

6. The system defined in claims 1 or 2 further comprising:

data delay buffer means for introducing a delay, the introduced delay matching a nominal time required
   (a) for the locating means to identify the location of the appended PN sequence as recovered in the received sync word and
   (b) for the determining means to identify the state corresponding to that recovered PN sequence.

7. The system defined in claim 6 further comprising:
   finite field multiplier means for adjusting the state of the recovered PN sequence and for adjusting the delay introduced by the data delay buffer means.

8. The system defined in any of claims 1 or 2 wherein the means for appending a sync word comprises:

means responsive to the PN state for randomizing the generated sync word and
   means for providing the randomized generated sync word as the generated sync word.

9. The system defined in claim 8 wherein the randomizing means comprises:

means for generating the exclusive OR of the PN state and the majority of a predetermined number of the bits of the PN state appended to the compliment of the exclusive OR of the PN state and the majority of the predetermined number of the bits of the PN state.

10. The system defined in claim 9 where the predetermined number of the bits is three bits.

11. The system defined in any of claims 1 or 2 further comprising:

means responsive to the PN state for de-randomizing the received sync word; and
    means for providing the de-randomized generated sync word to the read buffer as the received sync word.

12. Data synchronization apparatus comprising:
    means for applying a reversible operation to a word in a sequence of data words in a data stream and for applying a first function to a pseudo-random (PN) state of a PN generator that corresponds to the word;
    means for appending a bit to the word prior to transmitting the word in a data stream where the appended bit corresponds to the state of the PN generator;
    means for discovering the location of the PN sequence in the data stream of received data and for determining the PN state corresponding to that PN sequence;
    means for aligning received word boundaries with respect to the location of the PN sequence; and
    means for applying the reverse of the reversible operation to each received word and for applying the first function to the PN state associated with the PN sequence bit which was appended to the word thus restoring the original data.

13. The data synchronization apparatus defined in claim 12 wherein:

the means for applying a reversible operation to a word includes means for providing a modulo $2^N$ addition over a set of bit fields in the word, and wherein:
    the means for applying the reverse of the reversible operation to each received word includes means for providing a modulo $2^N$ subtraction for over a set of bit fields in the word.

14. The data synchronization apparatus defined in claim 13 where all the bit fields are single bits and where:

the means for applying the reverse of the reversible operation includes means for providing modulo 2 addition and an exclusive OR function.

15. The data synchronization apparatus defined in claim 12 where the means for applying a first function to a pseudo-random (PN) state of a PN generator that corresponds to the word includes: means for providing the exclusive OR of the PN state and the majority of a predetermined number of the bits of the PN state appended to the compliment of the exclusive OR of the PN state and the majority of the predetermined number of the bits of the PN state.

16. The data synchronization apparatus defined in claim 15
    where the majority is over bits 0, 4, and 11 counting the least significant bit (LSB) as bit 0 and the most significant bit (MSB) as bit 15 and
    where the coefficients of the PN generator polynomial are $x^{16}+x^{12}x^3+x+1$.

17. The data synchronization apparatus defined in claim 12 further comprising:
    data delay buffer means for providing a delay matching the nominal time required for the discovering and determining means
    (a) to discover the location in the received data word of the bit that was appended to the data word from the PN sequence; and
    (b) to determine the PN state of a recovered PN sequence that corresponds to the discovered location.

18. The data synchronization apparatus defined in claim 17 further comprising:
    finite field multiplier means for adjusting the PN state of the recovered PN sequence and for adjusting the delay introduced by the data delay buffer means.

19. Synchronization recovery apparatus comprising:
    means for determining a bit location of a sync bit in a data stream where the sync bit is a bit from a pseudo-random (PN) generated sequence;
    means responsive to the sync bit in the determined bit location for detecting a PN state corresponding to the sync bit in the PN sequence,
    the bit location determining means and PN state detecting means comprising:
       an array of correlators, each correlator including:
          a PN state detector and
          counter and control means;

means for selecting an output from a correlator; and flywheel means responsive to the detected PN state and to the counter and control means for operating the selected correlator so as to use or not to use the output of a PN generator and correlator position as the PN state and as the bit location of the sync bit, respectively.

20. The synchronization recovery apparatus of claim 19 wherein the flywheel means further comprises:

means operative when the output of the PN generator and correlator position are not used as the PN state and as the bit location of the sync bit, respectively, for providing as the PN state and the bit location of the sync bit, respectively, values that were determined from previous information to be the PN state and the bit location of the sync bit, respectively.

21. The synchronization recovery apparatus defined in claims 19 or 20 further comprising:

means responsive to a count threshold for signaling whether a correlator is locked or not locked.

22. The synchronization recovery apparatus defined in claim 21 further comprising:

means responsive to the correlator being locked for storing the bit location of the sync bit and the PN state from the locked correlator for later use as the previously determined information.

23. The synchronization recovery apparatus defined in claim 21 further comprising:

means responsive to exactly one correlator being locked for providing the bit location and the PN state from that locked correlator.

24. The synchronization recovery apparatus defined in claims 19 or 20 further comprising:

means responsive either to no correlators being locked or to more than one correlator being locked for providing as the bit location of the sync bit and as the PN state, respectively, values from the previously determined information.

25. The synchronization recovery apparatus defined in claims 19 or 20 where:

the means for selecting the correlator output includes:
a binary tree of nodes where each node has two inputs and one output and
means for determining if zero, one, or more than one of the correlators extending a respective output to at least one node are locked and for providing the result of that determination to the flywheel means.

26. A system for recovering synchronization of data symbols between a transmitter and a receiver, the system comprising:

transmitter means for buffering error correcting code (ECC) codewords, each ECC codeword including at least one data symbol;

transmitter means for converting buffered ECC codewords into a sync word data field;

transmitter means for respectively appending a pseudo-randomly (PN) generated sync pattern to each of a plurality of sync word data fields;

receiver means responsive to the transmitter PN generated sync pattern for recovering synchronization and for aligning a data symbol into its proper position in a received ECC codeword;

means for receiving an ECC block of sync words, a sync word being formed by a transmitter appending a sync bit from the pseudo-randomly generated sync pattern to a sync word data field;

means for detecting the pseudo-random pattern of sync bits in a plurality of the Sync words of the ECC block; and means responsive to the detected pseudo-random pattern for generating addresses in a read buffer into which the symbols from the plurality of sync words are to be written.

27. Synchronization recovery apparatus comprising:

means for receiving a word of predetermined size, the received word including a first pseudo-randomly generated sync bit from a pseudo-random (PN) sequence;

means for generating a second pseudo-randomly generated sync bit sequence, where the second pseudo-randomly generated sync bit sequence is a reconstruction of the first pseudo-randomly generated sync bit sequence;

means for correlating a bit of a received word with a bit from the second, reconstructed pseudo-randomly generated bit sequence; and means responsive to the correlation for aligning the received word as an aligned sync word;

means responsive to the alignment for identifying a sync bit in the aligned sync word; and means responsive to the sync bit in the aligned sync word for generating an address for writing the aligned sync word in a read buffer.

28. Synchronization recovery apparatus comprising:

means for receiving a word of predetermined size, the received word including a first pseudo-randomly generated sync bit from a pseudo-random (PN) sequence;

means for generating a second pseudo-randomly generated sync bit sequence, where the second pseudo-randomly generated sync bit sequence is a reconstruction of the first pseudo-randomly generated sync bit sequence;

means for correlating a bit of a received word with a bit from the second, reconstructed pseudo-randomly generated bit sequence; and means responsive to the correlation for aligning the received word as an aligned sync word;

means responsive to the reconstructed pseudo-randomly generated sync bit for determining a "most likely" bit position for a sync bit within the received word; and means responsive to the reconstructed pseudo-randomly generated sync bit and responsive to the "most likely" sync bit position for generating an address corresponding to the sync word within the error correcting code (ECC) block.

29. Synchronization recovery apparatus comprising;

means for receiving a word of predetermined size, the received word including a first pseudo-randomly generated sync bit from a pseudo-random (PN) sequence;

means for generating a second pseudo-randomly generated sync bit sequence, where the second pseudo-randomly generated sync bit sequence is a reconstruction of the first pseudo-randomly generated sync bit sequence;

means for correlating a bit of a received word with a bit from the second, reconstructed pseudo-randomly generated bit sequence; and means responsive to the correlation for aligning the received word as an aligned sync word; and means for writing the aligned sync word in a read buffer.

30. Apparatus for associating a pseudo-random (PN) state of a first PN generator with data locations in a read buffer, the read buffer for storing data words, the apparatus comprising:
  means for discovering the position of a PN sequence in a data stream of data words and for determining the PN state corresponding to the PN sequence in the data stream;
  means responsive to an output from a PN detector and to the position of the PN sequence in the data stream for aligning word boundaries with respect to the location of the PN sequence; and
  means for associating the PN state of the PN sequence in the data stream with locations in the read buffer so that data can be written into locations in the read buffer corresponding to those locations the data occupied in a write buffer.

31. The apparatus defined in claim 30 further comprising:
  means for resetting a second PN generator to an initial state prior to writing data in the read buffer and
  means for advancing the PN state of the second PN generator prior to the writing into each subsequent read buffer location.

32. The apparatus defined in claim 30 wherein the means for associating the PN state of the PN sequence in the data stream with data locations in a read buffer includes:
  means for looking up the PN state corresponding to each position in the received PN sequence in a memory.

33. Apparatus for applying a reversible operation to each word of a sequence of data words in a data stream, the apparatus comprising:
  means responsive to each pseudo-random (PN) state of a PN generator for applying a first function to a data word; the first function including:
    means responsive to the PN state for generating a randomizing bit pattern; and
    means for applying the randomized bit pattern to the data word;
  means for appending a corresponding bit from a PN sequence that is provided by the PN generator, the bit being appended to the data word prior to communicating the data word in the data stream;
  means for discovering the location of the PN sequence in the data stream;
  means for determining the PN state corresponding to the discovered PN sequence.

34. The apparatus defined in claim 33 further comprising:
  means for aligning word boundaries with respect to the location of the PN sequence in the data stream.

35. The apparatus defined in claims 33 or 34 further comprising:
  means for applying the reverse of the reversible operation to each received word in the data stream and
  means for applying the same first function of the PN state associated with PN sequence bit which was appended to the word thus restoring the original data.

36. The apparatus defined in claims 33 or 34 further comprising:
  reversible operation means including means for providing a bit field-wise modulo $2^N$ addition, and reverse operation means including means for providing a bit field-wise modulo $2^N$ subtraction for over a set of bit fields in the word.

37. The apparatus defined in claim 36 where all the bit fields are single bits and where the reversible operation means further includes means for providing modulo 2 addition or the exclusive OR function.

38. The apparatus defined in claim 37 where the first function is the exclusive OR of the PN state and the majority of three of the bits of the PN state appended to the compliment of the exclusive OR of the PN state and the majority of three of the bits of the PN state.

39. The apparatus defined in claim 38 where the majority is over bits 0, 4, and 11 counting the least significant bit (LSB) as bit 0 and the most significant bit (MSB) as bit 15 and where the coefficients of the PN generator polynomial are $x^{16}+x^{12}+x^3+x+1$.

40. A synchronization recovery method comprising the steps of:
  associating a pseudo-random (PN) state of a transmitter PN generator with a data location in a write buffer;
  appending a bit from a PN sequence from the transmitter PN generator to data read from the write buffer to generate a sync word;
  transmitting the sync words in a bit stream;
  locating the appended PN sequence bit position in received data words from the bit stream;
  recovering the PN state corresponding to the received sync word from the received PN sequence;
  responsive to the recovered PN state, associating the PN state of the received sync word with a data location in a read buffer; and
  responsive to the PN sequence bit position in the received sync word, aligning word boundaries of the received sync word with respect to the location of the appended position within the PN sequence.

41. The method defined in claim 40 wherein the step of associating the PN state of the received sync word with a data location in a read buffer comprises the step of:
  associating the state of the PN sequence with data locations in the read buffer so that data from the received sync word can be written into locations in the read buffer which correspond to locations the data occupied in the write buffer.

42. The method defined in claim 40 wherein the step of associating the PN state of the received sync word with a data location in a read buffer further comprises the steps of:
  resetting the transmitter PN generator to an initial state prior to reading the first data location from the write buffer, and
  advancing the state of the transmitter PN generator prior to the reading of each subsequent write buffer location and
  wherein the step of correlating the state of the PN sequence with data locations between a write buffer and a read buffer comprises the step of:
  looking up the state corresponding to each bit position in the recovered PN sequence in a table of a memory.

43. The method defined in claim 42 further comprising the steps of:
  introducing a delay in the received sync words, the introduced delay matching a nominal time required (a) for identifying the location of the appended PN sequence as recovered in the received sync word and (b) for identifying the state corresponding to the recovered PN sequence.

44. The method defined in claim 43 further comprising the step of:

adjusting the state of the recovered PN sequence and adjusting the delay introduced by the data delay buffer means.

45. The method defined in any of claims 40, 41, 42, 43, or 44 wherein the received sync word is generated by the step of:

responsive to the transmitter PN state, randomizing the sync word and providing the randomized generated data word as the received sync word.

46. The method defined in any of claim 45 further comprising the steps of:

responsive to the recovered PN state in the receiver, de-randomizing the received sync word and providing the de-randomized generated sync word to the read buffer.

* * * * *